(12) United States Patent
Treece et al.

(10) Patent No.: US 8,893,908 B2
(45) Date of Patent: Nov. 25, 2014

(54) EXTRUSION BLOW MOLDING SYSTEM HAVING ENHANCED PINCH GEOMETRY

(71) Applicant: Eastman Chemical Company, Kingsport, TN (US)

(72) Inventors: Mark Allan Treece, Jonesborough, TN (US); William Joseph Burgess, Jonesborough, TN (US); Harold Eugene Dobbs, Kingsport, TN (US); Michael Wandell Cradic, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/944,947

(22) Filed: Jul. 18, 2013

(65) Prior Publication Data
US 2014/0034658 A1 Feb. 6, 2014

Related U.S. Application Data

(60) Provisional application No. 61/679,392, filed on Aug. 3, 2012.

(51) Int. Cl.
| | | |
|---|---|---|
| *B65D 1/02* | (2006.01) | |
| *B29D 22/00* | (2006.01) | |
| *B29C 49/50* | (2006.01) | |
| *B29C 49/72* | (2006.01) | |
| *B29C 49/48* | (2006.01) | |

(52) U.S. Cl.
CPC ............ *B65D 1/0261* (2013.01); *B65D 1/0276* (2013.01); *B29D 22/003* (2013.01); *B29C 2049/4812* (2013.01); *B29C 49/50* (2013.01); *B29C 49/72* (2013.01); *B29C 49/4817* (2013.01)
USPC .......................................... 215/373

(58) Field of Classification Search
CPC ............................ B65D 1/0261; B65D 1/0223
USPC .......... 215/373, 372, 371, 376; 220/606, 605, 220/604, 608
See application file for complete search history.

(56) References Cited

U.S. PATENT DOCUMENTS

| | | |
|---|---|---|
| 3,424,829 A | 1/1969 | Peters et al. |
| 3,428,722 A | 2/1969 | Chittenden et al. |

(Continued)

FOREIGN PATENT DOCUMENTS

| | | |
|---|---|---|
| EP | 2468642 A1 | 6/2012 |
| JP | H0699965 A | 4/1994 |

(Continued)

OTHER PUBLICATIONS

Notification of Transmittal of the International Search report and The Written Opinion of the International Searching Authority, or the declaration—International Application No. PCT/US2013/052824 with a mailing date of Nov. 7, 2013.

(Continued)

*Primary Examiner* — Robert J Hicks
(74) *Attorney, Agent, or Firm* — Louis N. Moreno

(57) ABSTRACT

Extrusion blow mold assemblies, extrusion blow molded articles exhibiting increased strength and enhanced processability, and processes for making said articles. In some aspects, the articles produced herein can include relatively rigid bottles and other containers that exhibit high drop impact performance, while still being relatively easy to deflash. Such containers can be efficiently produced on a commercial scale and are widely usable in a variety of applications, including those in the food, beverage, cosmetic, and medical industries.

20 Claims, 18 Drawing Sheets

(56) References Cited

U.S. PATENT DOCUMENTS

| | | | |
|---|---|---|---|
| 3,480,168 A | 11/1969 | Lee | |
| 3,499,071 A | 3/1970 | Hurst | |
| 3,535,411 A | 10/1970 | Bowles | |
| 3,598,270 A | 8/1971 | Adomaitis et al. | |
| 3,606,113 A | 9/1971 | Lichtman et al. | |
| 3,757,978 A | 9/1973 | Gilbert | |
| 3,917,095 A * | 11/1975 | Seefluth | 215/371 |
| 4,026,984 A | 5/1977 | Seefluth | |
| 4,122,142 A | 10/1978 | Lawrence et al. | |
| 4,174,783 A | 11/1979 | Abe et al. | |
| 4,272,233 A | 6/1981 | Cochran | |
| 4,305,904 A | 12/1981 | Black | |
| 4,334,627 A | 6/1982 | Krishnakumar et al. | |
| 4,755,404 A * | 7/1988 | Collette | 428/36.92 |
| 4,846,359 A | 7/1989 | Baird et al. | |
| 4,989,738 A | 2/1991 | Thayer et al. | |
| 5,021,209 A | 6/1991 | Dickinson | |
| 5,198,248 A * | 3/1993 | Krishnakumar et al. | 425/522 |
| 5,275,780 A | 1/1994 | Robinson | |
| 7,510,391 B2 | 3/2009 | Larson et al. | |
| 7,964,257 B2 | 6/2011 | Akiyama et al. | |
| 8,061,540 B2 | 11/2011 | Toyoda | |
| 2007/0138045 A1 | 6/2007 | Miller | |
| 2009/0230074 A1* | 9/2009 | Toyoda | 215/12.2 |

FOREIGN PATENT DOCUMENTS

| | | |
|---|---|---|
| JP | H06304998 A | 11/1994 |
| JP | 11240527 A | 9/1999 |
| JP | 2011213373 A | 10/2011 |

OTHER PUBLICATIONS

Ferguson, Lew; "How to Fix Pinch-Off Failures", Plastics Technology Online, Dec. 2005.

Lee, Norman C.; "Control Flash in Extrusion Blow Molding", Plastics Technology Online, Sep. 2002.

* cited by examiner

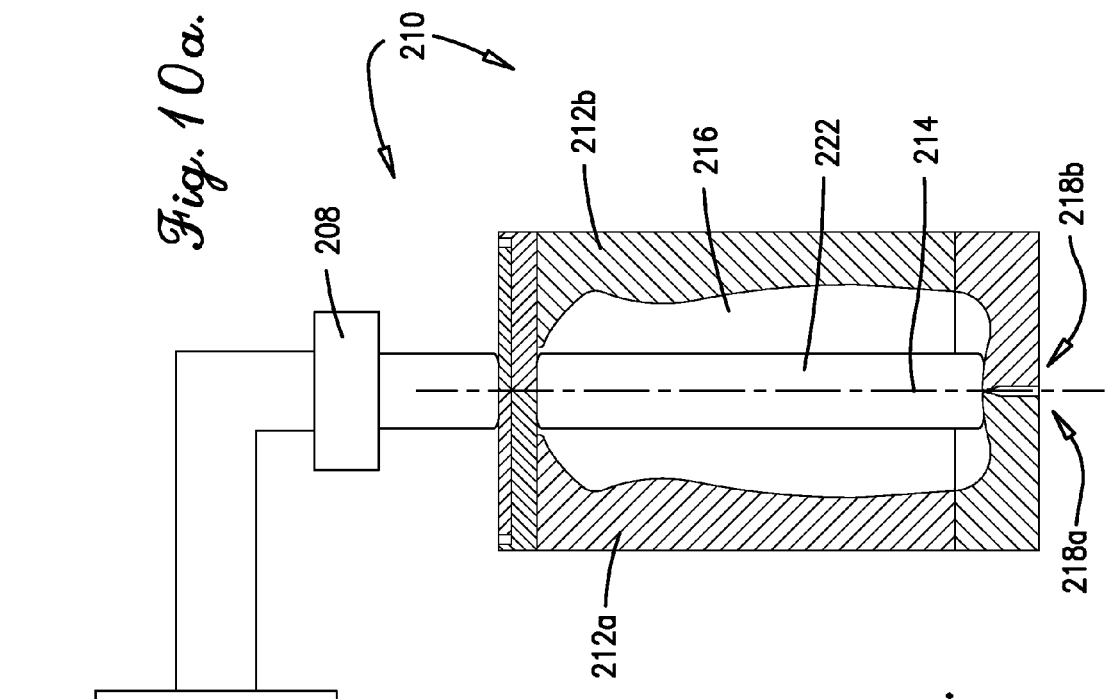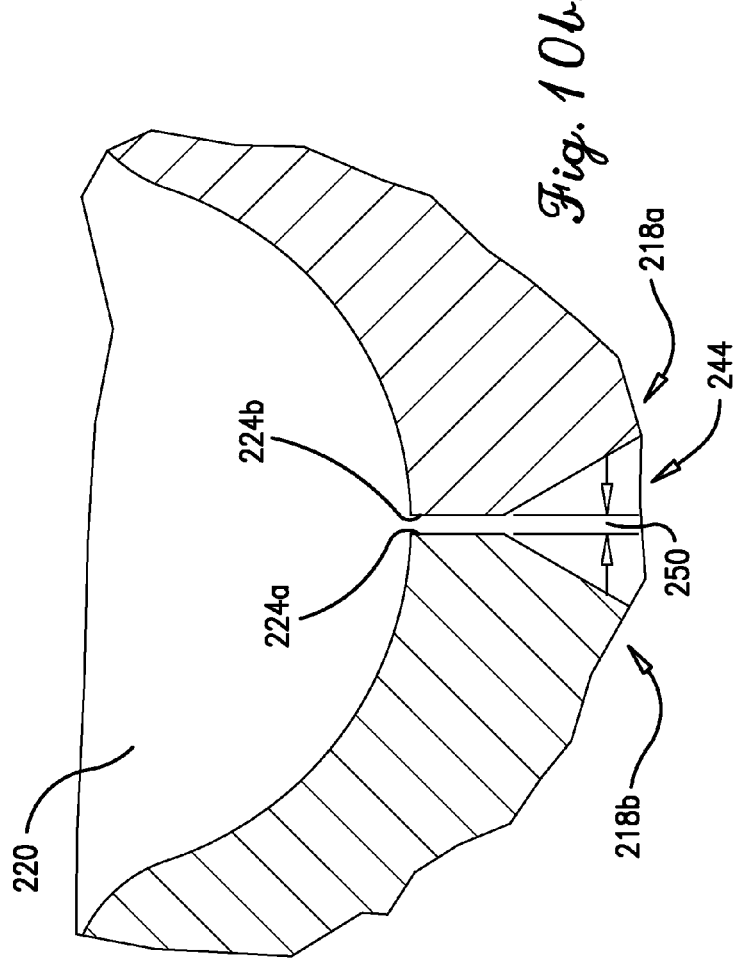

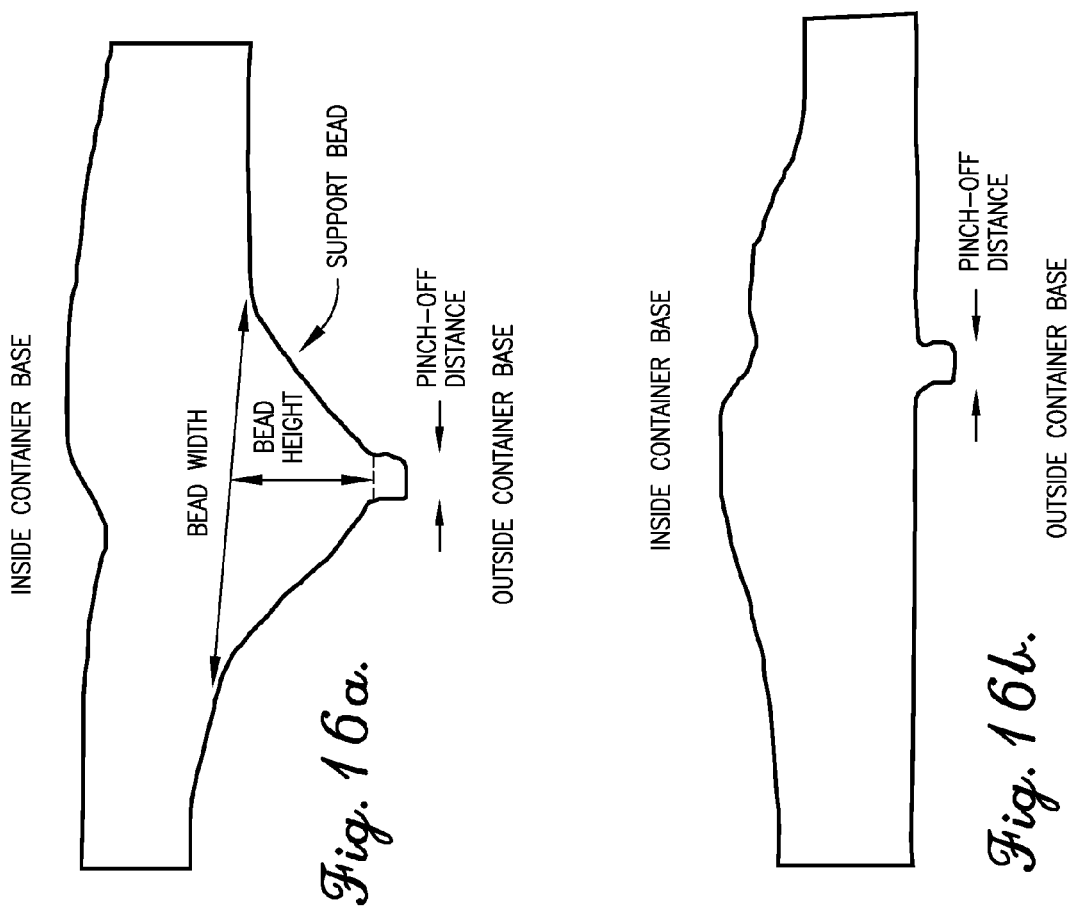
Fig. 16a.
Fig. 16b.
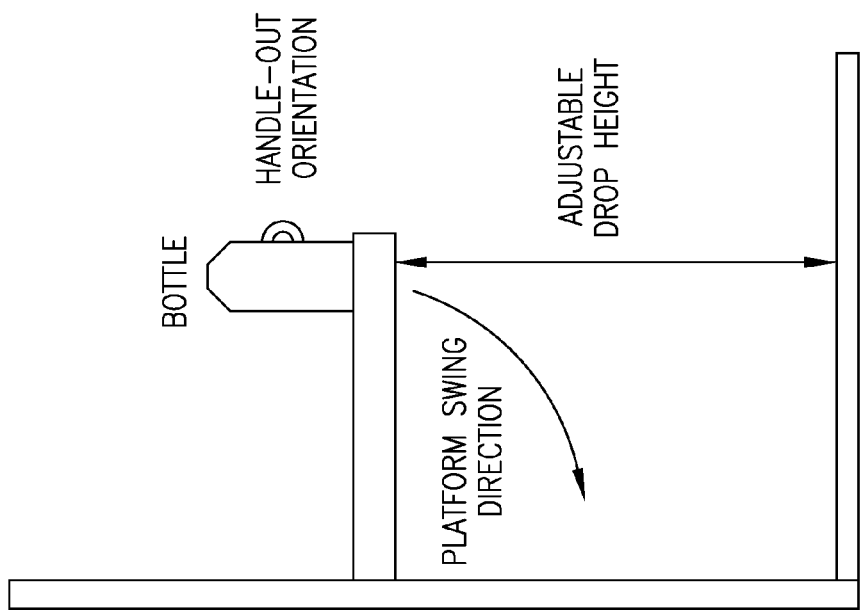
Fig. 17.

EXTRUSION BLOW MOLDING SYSTEM HAVING ENHANCED PINCH GEOMETRY

CROSS REFERENCE

This application claims the benefit of U.S. Provisional Application No. 61/679,392, filed Aug. 3, 2012, which is incorporated by reference in its entirety.

FIELD OF THE INVENTION

This invention relates to processes and systems for forming extrusion blow molded containers from one or more types of polymeric material.

BACKGROUND

Consumers value the ability to see the contents of their packages. Consumers also appreciate the toughness and gloss of containers made from polyester. Because of this combination of attributes, containers made from polyethylene terephthalate (PET) produced by the injection stretch blow molding process (ISBM) are the most common type of transparent container on the market. However, ISBM processes are generally limited to production of uniformly shaped containers and cannot produce bottles that include various types of handles, such as, for example, a through-handle. Oftentimes, handles are desirable in larger-volume bottles and containers, where gripping a round or square container is cumbersome for the end user. Larger-volume bottles containing a through-handle are most efficiently produced by extrusion blow molding (EBM) processes.

A typical extrusion blow molding process begins with the step of melting a polymeric material in an extruder to produce a molten resin that can then be extruded through a die to thereby form a tube of molten polymer (i.e., a parison). Two mold halves having the shape of the desired container are clamped around the parison and, thereafter, air or other pressurized fluid is blown into the mold to expand the extrudate to fill the interior of the mold cavity. The molded article is then cooled and ejected from the mold. Finally, excess polymeric material remaining around the edges and base of the container, typically referred to as "flash" can be removed via various mechanical means before using, shipping, or storing the final container.

Unfortunately, extrusion blow molded containers made from certain polyester resins tend to be rigid, brittle, and challenging to trim. Extrusion blow molded containers made from these types of polyesters tend to have a poor drop impact performance, due, at least in part, to the high degree of rigidity of the final container. In contrast, extrusion blow molded containers produced using polyolefins, such as high-density polyethylene (HDPE), exhibit less rigidity and tend to exhibit a better drop impact strength.

Many factors can influence the drop impact integrity of an extrusion blow molded container, such as, for example, the melt temperature of the parison, the mold temperature of the container and flash pocket, the mold closing speed (also known as the mold cushion level), the spacing between the mold halves (also known as the stand-off or pinch-off distance), the time between ejection of the container and its deflashing, the cooling time in the mold (also known as the mold cycle time), and/or the specific structural configuration of each of the mold halves. In some cases, choosing to alter one or more of the above-listed parameters in order to enhance drop impact strength actually results in a decline or degradation of one or more properties of the final container.

Thus, optimizing the drop impact strength of an extrusion blow molded container is a very complex process that is difficult to achieve. For example, although an increase in the cooling time or time-to-deflash of a certain container may increase the drop impact strength, the longer process time required to produce the container would decrease the economic viability of the process, especially on a commercial scale. Similarly, raising the melt temperature of the polymer being used to create the container may increase its strength, but such a change often results in poor parison stability and/or increased polymer degradation during processing.

In addition, while increasing the mold half spacing during processing may increase the drop impact strength, such a modification will also drastically increase the effort required to remove the "flash," or excess polymer, from the periphery of the finished container (e.g., the "torque to deflash"). Conversely, reducing the spacing between mold halves may cause the resulting flash to trim more easily, but such a change will cause the drop impact strength of the resulting container to suffer.

Thus, a need exists for a process and a system for producing durable extrusion blow molded containers having high drop impact strength yet are easy to deflash (or trim) Such containers should be able to be produced cost efficiently on a commercial scale.

SUMMARY

One embodiment of the present invention concerns an extrusion blow molding (EBM) system for producing a container. The EBM system comprises a mold assembly comprising first and second mold halves. The mold assembly is shiftable between an open configuration where the mold halves are spaced from one another and a closed configuration where at least a portion of the mold halves contact one another and defines a parting plane along which the mold halves contact one another when the mold assembly is in the closed configuration. Each of the mold halves presents a base-forming surface and a tail-forming surface adjacent the base-forming surface and each of the mold halves defines a pinch line extending along the junction of the base-forming surface and the tail-forming surface. A pinch point gap of at least 0.001 inches is formed between the pinch lines of each of the mold halves when the mold assembly is in the closed configuration. The base-forming surface of each of the mold halves presents a pushup-forming surface and a bead-forming surface adjacent the pushup-forming surface and each of the mold halves defines a bead base line extending along the junction of the pushup-forming surface and the bead-forming surface. The bead-forming surface of each mold half extends between the bead base line and the pinch line of the mold half and each of the mold halves defines a bead angle reference line extending through the bead base line and the pinch line. A bead extension angle of at least 20 degrees and not more than 70 degrees is defined between the parting plane and the bead angle reference line.

Another embodiment of the present invention concerns an extrusion blow molded container comprising a neck, a body, and a base. The base of the container comprises at least one base parting line resulting from the formation of said container in a blow molding apparatus and a parting line support bead for reinforcing at least a portion of said base parting line. The ratio of the height of the support bead to its width is at least 0.05:1 and not more than 2:1.

Yet another embodiment of the present invention concerns an extrusion blow molded container comprising a neck, a body, a base, and a supported tail flash extending along at least a portion of the base. The supported tail flash includes a support bead coupled to the base and an elongated portion extending outwardly from at least part of the support bead. The elongated portion of the tail flash is configured for removal from the support bead. The torque required to remove the elongated portion from the support bead is at least 15 percent less than the torque required to remove the tail flash from an analogous extrusion blow molded container that does not include a support bead.

Still another embodiment of the present invention concerns a process for producing an extrusion blow molded container. The process comprises the steps of (a) extruding a polymeric material into an open-ended parison; (b) closing at least a portion of the parison between opposing pinch points of two shiftable mold halves to thereby form a sealed parison; (c) expanding at least a portion of the sealed parison against an inner surface of a mold cavity defined between the two shiftable mold halves using a pressurized fluid to thereby provide an initial blow molded container comprising a base parting seam and a tail flash extending from at least a portion of the base parting seam; (d) removing the initial blow molded container from the mold cavity; and (e) removing at least a portion of the tail flash from the base parting seam of the initial container to provide a deflashed container, wherein the deflashed container comprises a support bead extending along at least a portion of the base parting seam and wherein the removing of step (e) is carried out with at least about 15 percent less torque than would be required to remove the tail flash from an analogous bottle having no support bead.

BRIEF DESCRIPTION OF THE DRAWINGS

Various embodiments of the present invention are described in detail below with reference to the attached drawing figures, wherein:

FIG. 6b is an enlarged fragmentary view of the pinch region of mold assembly shown in FIG. 6a;

FIG. 10a is a schematic view of an EBM system configured according to one embodiment of the present invention, particularly illustrating the step of closing the mold halves onto the parison in the EBM process;

FIG. 10b is an enlarged fragmentary view of the pinch region of the mold assembly shown in FIG. 10a;

FIG. 13b is an enlarged fragmentary view of the pinch portion of tail flash shown in FIG. 13a;

FIG. 16a is a schematic cross section of the base region of a bottle produced as described in Example 1 using the inventive mold assembly having a pinch region configured as illustrated in FIG. 15b;

FIG. 16b is a schematic cross section of the base region of a bottle produced as described in Example 1 using the comparative mold assembly having a pinch region configured as illustrated in FIG. 15a;

FIG. 17 is a schematic diagram of a swing-away platform ledge with variable height adjustment used to test the drop impact strength of bottles produced in Example 1;

DETAILED DESCRIPTION

Figure 1:
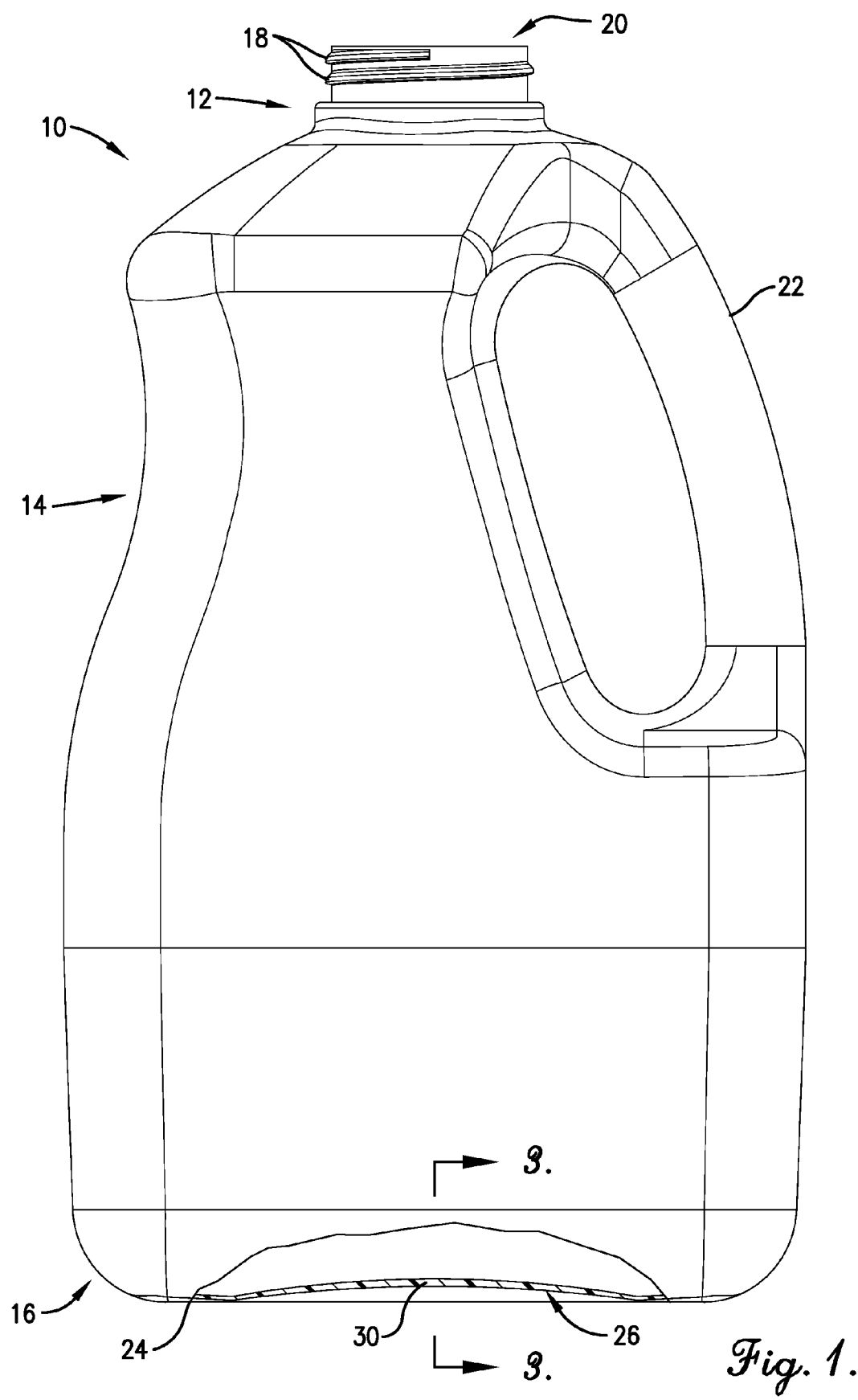
FIG. 1 is a side elevation view of a bottle according to one embodiment of the present invention, particularly illustrating a support bead located at the base of the bottle.

Extrusion blow molding (EBM) processes and systems according to one or more embodiments of the present invention can be useful for producing containers having superior strength and enhanced processability. As used herein, the term "container" refers to any receptacle for holding or storing a material. Exemplary containers can include, but are not limited, to bottles, vials, tubes, and jars. Containers produced according to embodiments of the present invention have wide application in a number of industries, including, for example, the food, beverage, cosmetic, medical, and personal care industries. In one embodiment, EBM processes and systems described herein can be used to produce one or more types of bottles. As used herein, the term "bottle" refers to any receptacle made of thermoplastic material used for storing or holding liquid. One embodiment of a bottle configured and produced according to one or more embodiments of the present invention will now be described in detail with respect to the drawing figures.

Figure 2:
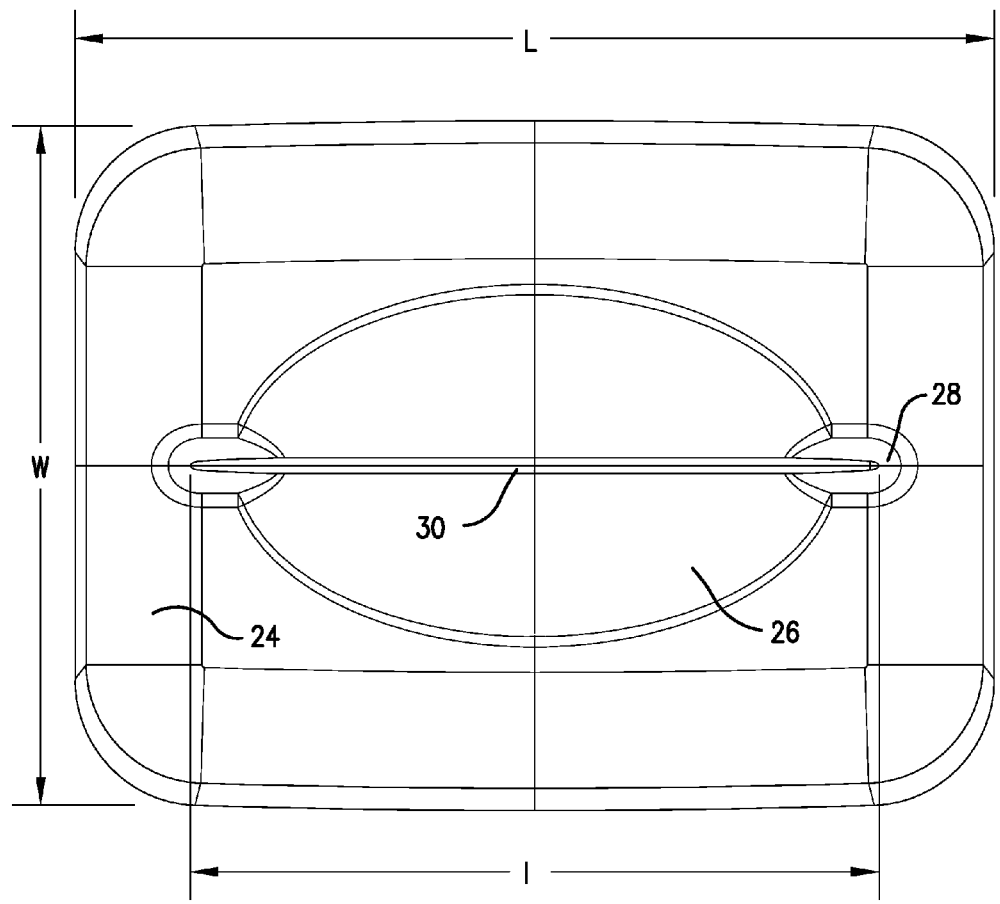
FIG. 2 is a bottom plan view of the bottle depicted in FIG. 1.
Figure 3:
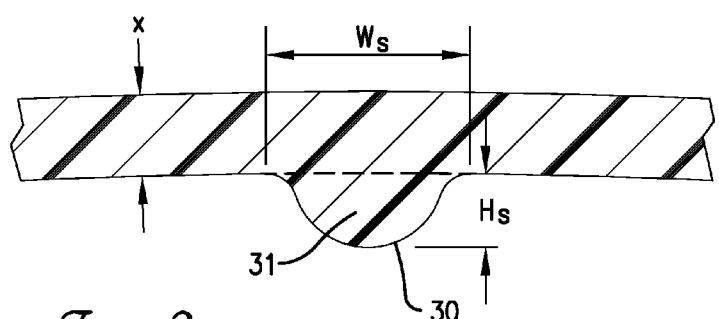
FIG. 3 is a fragmentary section view taken along line 3-3 in FIG. 1, particularly illustrating the cross section of the support bead depicted in FIG. 1.

Turning initially to FIGS. 1-3, a bottle 10 is generally illustrated as comprising a neck 12, a body 14, and a base 16 integrally formed with body 14. Although described herein with reference to a bottle, it should be understood that embodiments of the present invention are equally applicable to any type of suitable container, including those listed above. Turning back to bottle 10 illustrated in FIGS. 1-3, neck 12 can comprise one or more threads or other closure devices 18 located at or near an opening 20 disposed in the upper portion of bottle 10. Bottle 10 can further comprise a handle 22 coupled to at least a portion of body 14 and, in one embodiment, bottle 10 can be a through-handle bottle.

In one embodiment shown in FIG. 2, base 16 of bottle 10 includes a support portion 24 for supporting bottle 10 on a generally flat surface and a push-up portion 26 which is elevated slightly from support portion 24. In addition, base 16 of bottle 10 includes at least one base parting seam 28 resulting from the formation of bottle 10 in an extrusion blow molding apparatus (not shown in FIG. 1). Additional details regarding various embodiments of EBM processes and systems according to the present invention will be discussed in detail shortly.

In accordance with one embodiment of the present invention, extrusion blow molded bottle 10 can include at least one support bead 30 extending along base 16 for reinforcing at least a portion of base parting seam 28. As illustrated in FIG. 2, base parting seam 28 and support bead 30 can extend parallel to length, L, of base 16. As used herein, the term "length" refers to the maximum or longest dimension of an item or component. In one embodiment, the length of base 16 can be at least about 2 inches, at least about 4 inches, at least about 6 inches and/or not more than about 12 inches, not more than about 10 inches, or not more than about 8 inches. In another embodiment, the length can be in the range of from about 2 to about 12 inches, from about 4 to about 10 inches, or about 6 to about 8 inches. When base 16 has a non-symmetric cross section, it may also define a second longest dimension, or width, W, as shown in FIG. 2. The width of base 16 can be at least about 2 inches, at least about 3 inches, at least about 4 inches and/or not more than about 8 inches, not more than about 6 inches, or not more than about 6 inches. In another embodiment, the width can be in the range of from about 2 to about 10 inches, from about 3 to about 8 inches, or from about 4 to about 6 inches.

In one embodiment of the present invention, the ratio of the length (I) of support bead 30 to the length (L) of base 16 can be at least about 0.25:1, at least about 0.35:1, at least about 0.50:1 and/or not more than about 1:5, not more than about 1.2:1, not more than about 1:1, not more than about 0.95:1, not more than about 0.90 not more than about 0.85:1, not more than about 0.80:1, or not more than about 0.75:1. In another embodiment, this ratio can be in the range of from about 0.25:1 to 1.5:1, about 0.35:1 to about 1.2:1, or about 0.50:1 to about 0.95:1. In some embodiments when the ratio of the length of the support bead to the length of the base is greater than 1:1, the support bead may extend upwardly along at least a portion of one of the sidewalls of bottle 10.

Turning now to FIG. 3, a cross sectional view of support bead 30 taken along lines 3-3 in FIG. 1 is provided. Support bead 30 can have a height ($H_S$) and a width ($W_S$) as shown in FIG. 3. In one embodiment, the height of support bead 30 can be at least about 0.005 inches, at least about 0.01 inches, at least about 0.02 inches and/or not more than about 0.10 inches, not more than about 0.075 inches, or not more than about 0.050 inches. In one embodiment, the height of support bead 30 can be in the range of from about 0.005 to about 0.10 inches, about 0.010 to about 0.075 inches, or about 0.02 to about 0.05 inches. According to one embodiment, the ratio of the height of support bead 30 to its width ($H_S$:$W_S$) is at least about 0.05:1, at least about 0.010:1, at least about 0.20:1 and/or not more than 2:1, not more than about 1:1, not more than about 0.75:1, or not more than about 0.50:1, or in the range of from about 0.05:1 to about 2:1, about 0.010:1 to about 1:1, about 0.20:1 to about 0.75:1.

As shown in FIG. 3, support bead 30 may have a relatively flat profile and may have a height similar to the thickness of bottle 10. For example, in one embodiment, the ratio of the average thickness (x) of base 16 adjacent support bead 30 to the height (H) of support bead 30 can be at least about 0.5:1, at least about 0.75:1, at least bout 1.01:1, at least about 1.1:1, at least about 1.15:1 and/or not more than about 5:1, not more than about 3:1, or not more than about 2:1, or in the range of from about 0.5:1 to about 5:1, about 1.1:1 to about 3:1, or about 1.15:1 to 2:1. In one embodiment, the average thickness (x) of base 16 may be at least about 0.01 inches, at least about 0.02 inches, at least about 0.03 inches and/or not more than about 0.075 inches, not more than about 0.065 inches, or not more than about 0.050 inches, as measured at ten equally spaced locations adjacent support bead 30, wherein five of the measurement locations are on one side of support bead 30 and five of the measurement locations are on the other side of support bead 30. In another embodiment, the average thickness of base 16 can be in the range of from about 0.01 to about 0.075 inches, about 0.03 to about 0.065 inches, or about 0.030 to about 0.050 inches.

Support bead 30 may be a solid bead that defines a lateral bead cross section 31, as shown in FIG. 3. In one embodiment, lateral bead cross section 31 may have an area equal to the height of support bead 30 multiplied by its width. In other embodiments, the area of lateral bead cross section 31 may be less than the height of support bead 30 multiplied by its width. For example, if support bead 30 had a height of 0.02 inches and a width of 0.08 inches, the area of lateral bead cross section 31 would be less than (0.02)×(0.08) or less than 0.0016 square inches ($in^2$). In some embodiments, the area of lateral bead cross section 31 may be not more than 95 percent, not more than about 90 percent, not more than 85 percent, not more than 80 percent, not more than 75 percent, or not more than 50 percent of this value.

Although illustrated as having a generally rounded profile, support bead 30 can have a number of suitable shapes. In one embodiment, lateral bead cross section 31 have a triangular or rectangular shape. In another embodiment, lateral bead cross section 31 can have a half-polygonal shape, such that support bead 30 has the shape of one half of an nth sided polygon, wherein n is an integer between 5 and 12, inclusive. In still another embodiment, at least a portion of lateral bead cross section 31 can be curved. When support bead 30 has an at least partially rounded cross section 31, the radius (R) of the curved portion may be at least about 0.005 inches, at least about 0.01 inches, at least about 0.02 inches and/or not more than about 0.10 inches, not more than about 0.075 inches, or not more than about 0.050 inches. In some embodiments, the radius can be the same as the height of support bead 30, while in other embodiments, the radius can be different than the height of support bead 30. Additional shapes for support bead 30 are contemplated and will be discussed in further detail shortly.

The presence of support bead 30 along at least a portion of base 16 may unexpectedly impart a higher degree of strength to bottle 10, as at least partially indicated by its drop impact performance. Drop impact performance may be measured in at least one of two ways. The first is the Bruceton staircase method in which the average drop failure height is determined. This method is similar to ASTM D2463 and is described in detail in Example 3. The second method of testing drop impact performance is a static drop impact test carried out at drop heights of 3, 4, and 5 feet. This procedure, described in detail in Example 4, measures the percent of bottles tested that pass (i.e., do not break or crack) when dropped from a certain height. In one embodiment, bottle 10 may have an average drop height, as measured with the Bruceton method, of at least about 3.5 feet, at least about 4.5 feet, at least about 5 feet and/or not more than about 10 feet, not more than about 8 feet, or not more than about 7 feet, or in the range of from about 3.5 to about 10 feet, about 4.5 to about 8 feet, or about 5 to about 7 feet.

According to some embodiments, bottle 10 can have a 3-foot drop impact pass rate, measured with the static drop impact test as described in Example 4, of at least about 50 percent, at least about 60 percent, at least about 70 percent, at least about 80 percent, at least about 85 percent, at least about 90 percent, or at least about 95 percent. The 4-foot drop impact pass rate of bottle 10 can be at least about 40 percent, at least about 50 percent, at least about 60 percent, at least about 70 percent, or at least about 75 percent, while the 5-foot drop impact pass rate of bottle 10 can be at least about 15 percent, at least about 20 percent, at least about 25 percent, at least about 35 percent, or at least about 40 percent, measured as described in Example 4.

Figure 4:
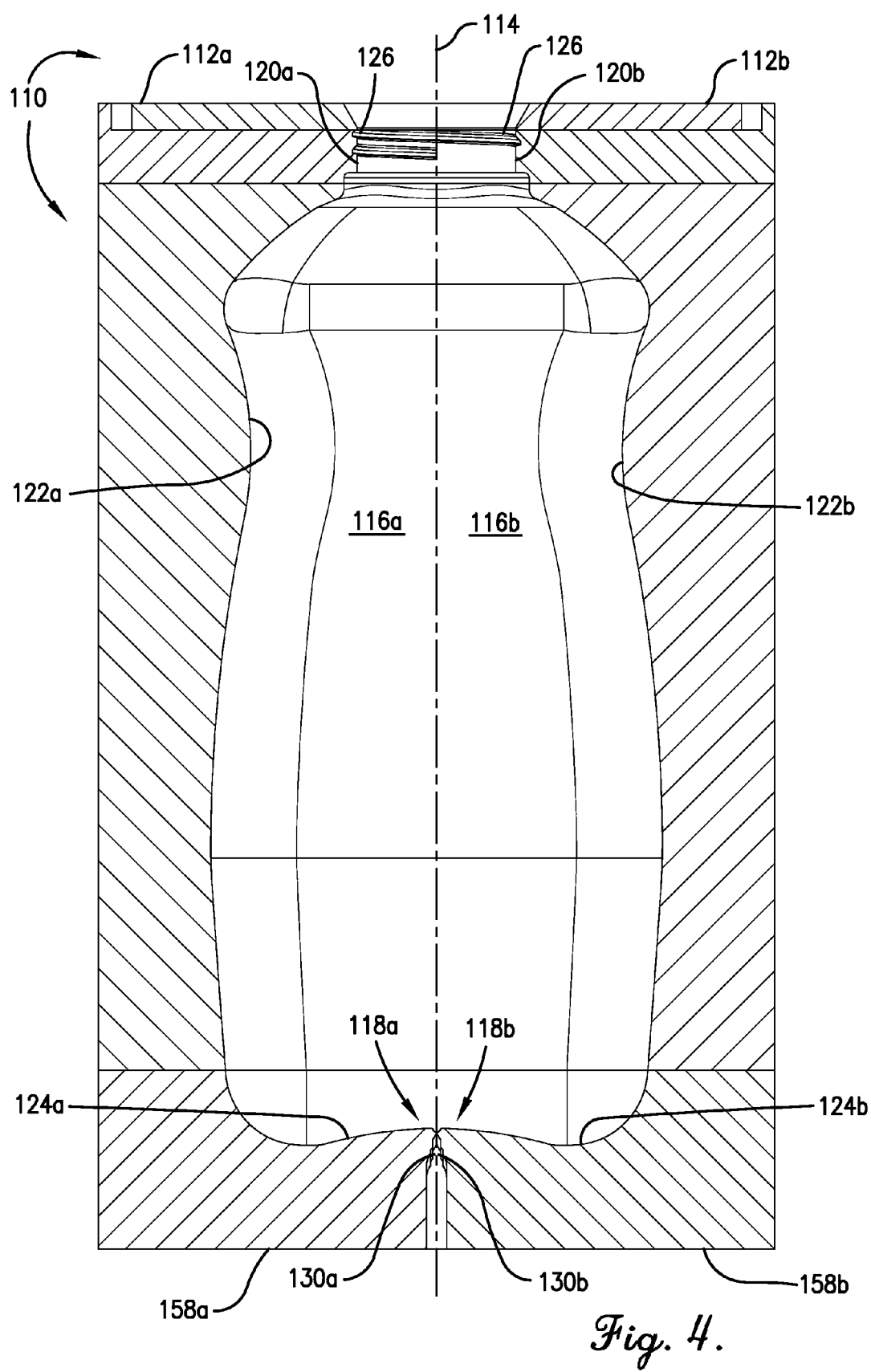
FIG. 4 is a cross sectional view of a mold assembly according to one embodiment of the present invention.
Figure 5:
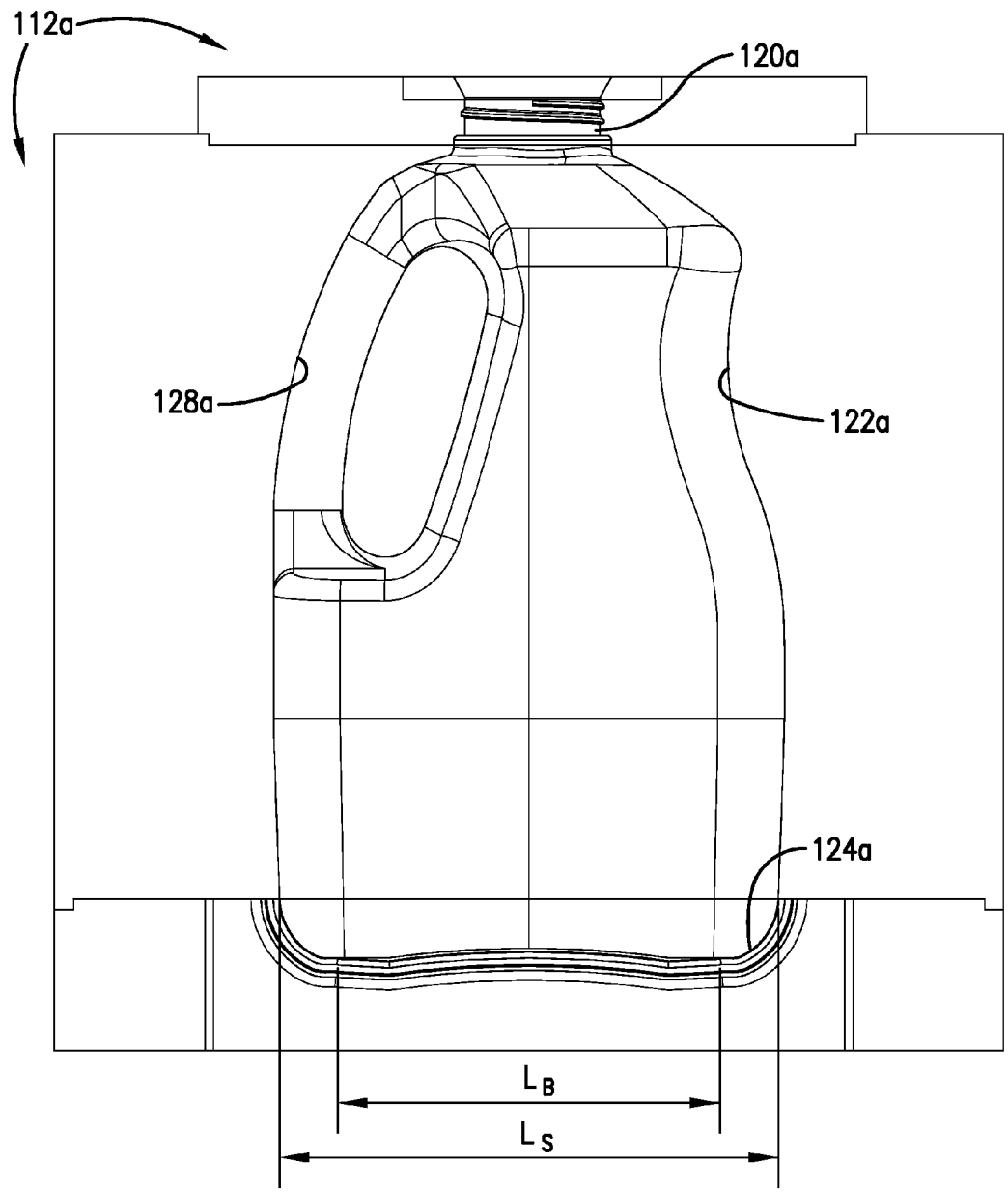
FIG. 5 is a side elevation view of one half of the mold assembly depicted in FIG. 4.

Turning now to FIGS. 4 and 5, a mold assembly 110 configured according to one embodiment of the present invention is provided. Mold assembly 110 is configured to produce a container, such as bottle 10, as described in detail above. As shown in FIG. 4, mold assembly 110 comprises two opposing mold halves 112a,b disposed on opposite sides of a parting plane 114, along which at least a portion of mold halves 112a,b contact when mold assembly 110 is in a closed configuration. Each of mold halves 112a,b comprises a cavity half 116a,b, which, when mold assembly 110 is in a closed configuration, collectively define a mold cavity having the shape of bottle 10. Each half 112a,b of mold assembly 110 presents a neck-forming surface 120a,b, a body forming surface 122a,b, a base-forming surface 124a,b, and a tail-forming surface 130a,b. Neck-forming surfaces 122a,b are configured to form the upper portion of bottle 10 and can include one or more thread forming recesses 126 for forming threads or other closure mechanisms at or near the neck of bottle 10. Body forming surfaces 122a,b are configured to form the main upright body of bottle 10 and may include at least one handle forming surface 128 integral with at least a portion of body forming surface 122, as illustrated in FIG. 5.

As shown in FIG. 4, each of mold halves 112a,b additionally comprise a pinch region 118a,b for cutting or perforating the molten polymer (not shown) during formation of bottle 10. According to one embodiment, pinch regions 118a,b of each of mold halves 112a,b present a bead-forming surface 140a,b for creating a support bead, such as support bead 30 discussed above, along the base of bottle 10. Additional details regarding pinch regions 118a,b will now be discussed in detail with particular reference to FIGS. 6a, 6b, and 7.

Figure 6A:
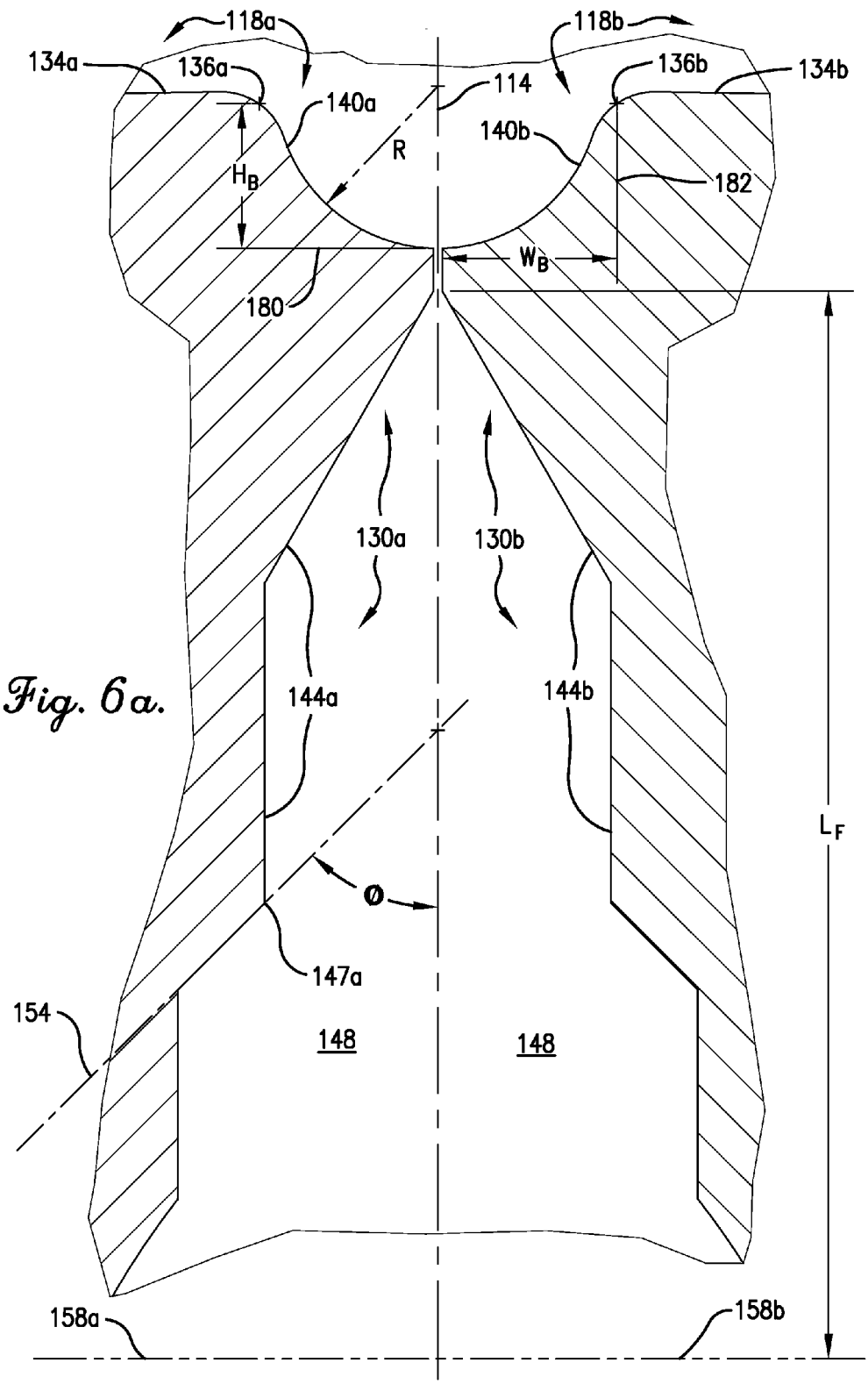
FIG. 6a is an enlarged fragmentary view of the lower region of the mold assembly shown in FIG. 4, particularly illustrating the configuration of opposing pinch regions of each mold half.
Figure 6B:
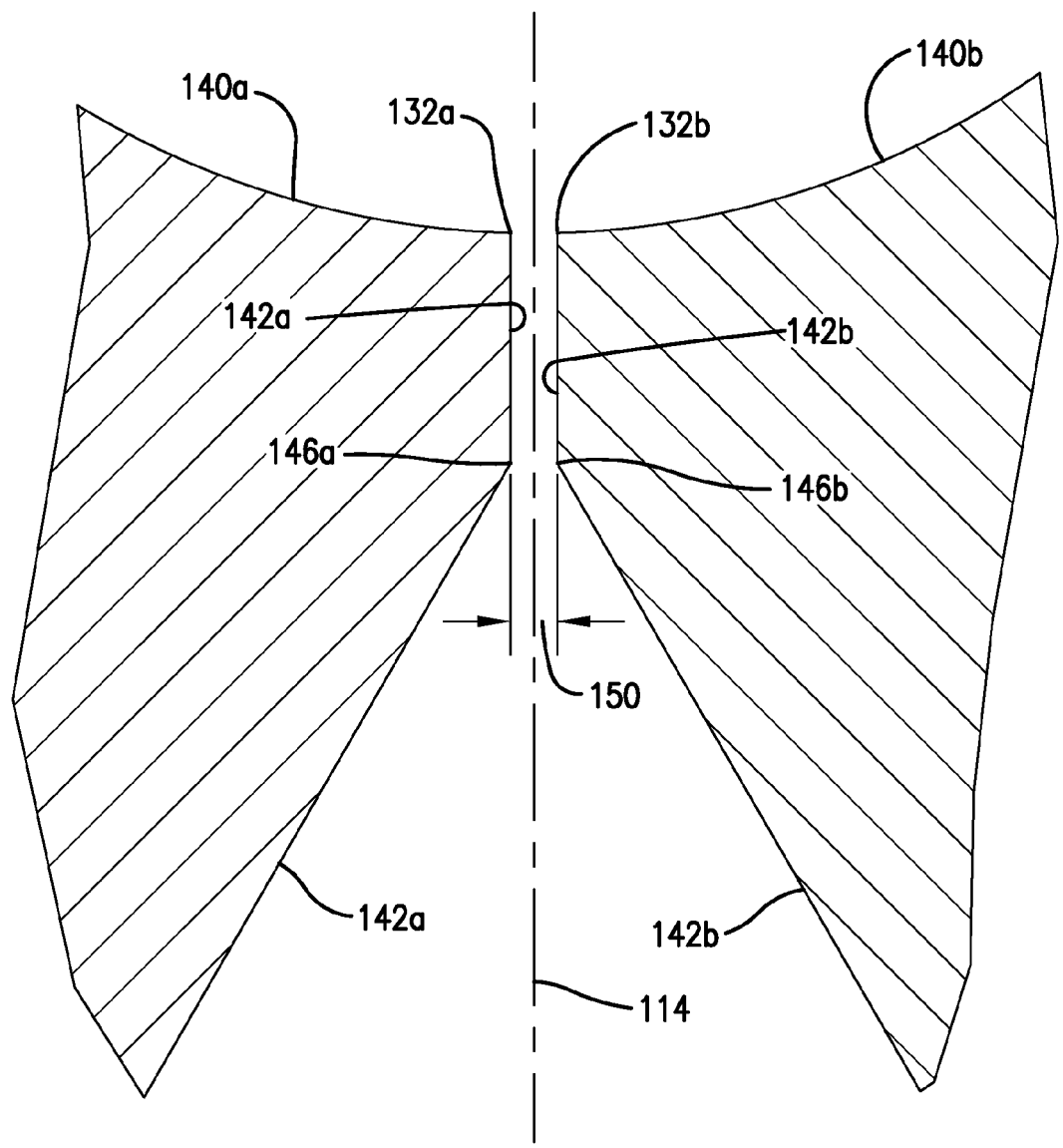

Turning first to FIGS. 6a and 6b, each mold half 112a,b defines a pinch line 132a,b extending along the junction of base-forming surfaces 124a,b and tail-forming surfaces 130a,b. In one embodiment, base-forming surface 124a,b presents a pushup-forming surface 134a,b for creating a pushup portion 26 in the base of bottle 10. Each of mold halves 112a,b further defines a bead base line 136a,b extending along the junction of pushup-forming surface 134a,b and bead-forming surface 140a,b such that bead-forming surfaces 140a,b extend between bead base lines 136a,b and pinch lines 132a,b of mold halves 112a,b, as shown in FIG. 6a.

Each bead-forming surface 140a,b has a bead surface height ($H_B$), illustrated with respect to mold half 112 in FIG. 6a, measured between bead base line 136a and a line 180 drawn perpendicular to parting plane 114 coincident with pinch lines 132a, shown with respect to mold half 112a in FIG. 6a. Each bead-forming surface 140 also has a bead surface width ($W_B$), measured between its pinch line 132b and a line 182 drawn parallel to parting plane 114 coincident with bead base lines 136b, shown with respect to mold half 112b in FIG. 6a. In one embodiment, the bead surface height and/or bead surface width can be at least about 0.005 inches, at least about 0.010 inches, at least about 0.015 inches and/or not more than about 0.10 inches, not more than about 0.075 inches, or not more than about 0.050 inches, or in the range of from about 0.005 to about 0.10 inches, about 0.010 to about 0.075 inches, or about 0.015 to about 0.050 inches. In one embodiment, the ratio of the bead surface height to the bead surface width ($H_B:W_B$) can be at least about 0.10:1, at least about 0.25:1, at least about 0.45:1 and/or not more than 2:1, not more than about 1:1, or not more than about 0.75:1, or in the range of from about 0.10:1 to about 2:1, about 0.25:1 to about 1:1, or about 0.45:1 to about 0.75:1.

Bead-forming surface 140a,b also has a bead surface length, $L_B$, that extends along at least a portion of base-forming surface 124a,b of each of mold halves 112a,b. In one embodiment, the ratio of the bead surface length to the length of base-forming surface 124, shown generally as $L_S$ in FIG. 5, can be at least about 0.25:1, at least about 0.35:1, at least about 0.50:1 and/or not more than about 1:5, not more than about 1.2:1, not more than about 1:1, not more than about 0.95:1, not more than about 0.90 not more than about 0.85:1, not more than about 0.80:1, or not more than about 0.75:1, or in the range of from about 0.25:1 to about 1.5:1, about 0.50:1 to about 1:1, or about 0.75:1 to about 0.90:1. Depending on the specific bottle or container being molded, the length of base-forming surface 124 can be at least about 2 inches, at least about 4 inches, at least about 6 inches and/or not more than about 24 inches, not more than about 18 inches, or not more than about 12 inches, measured along the longest dimension of base surface 124. In another embodiment, the length can be in the range of from about 2 inches to about 24 inches, about 4 inches to about 18 inches, about 6 inches to about 12 inches, measured as discussed above.

Figure 7:
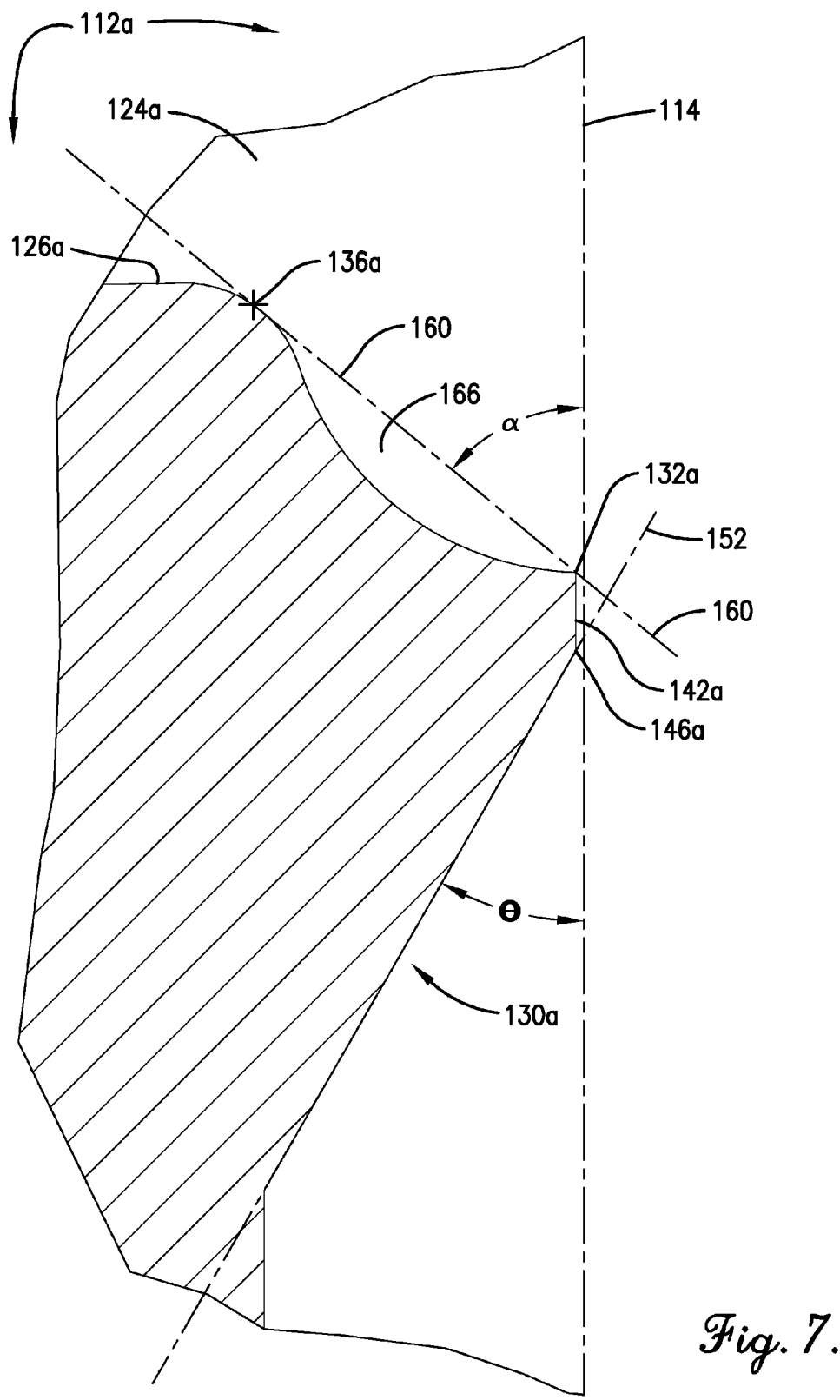
FIG. 7 is an enlarged fragmentary view of one of the pinch regions depicted in FIG. 6.

Turning now to FIG. 7, a detailed view of one embodiment of a bead-forming surface 140a defined by mold half 112a is provided. Although shown with reference to only one of halves of mold assembly 110, it should be understood that the features and components described with respect to FIG. 7 are equally applicable to the opposing mold half. As shown in FIG. 7, mold half 112a defines a bead angle reference line 160 extending through the midpoints of bead base line 136a and pinch line 132a and defining a bead extension angle, α, with parting plane 114. In one embodiment, bead extension angle α can be at least about 20°, at least about 30°, at least about 40° and/or not more than about 70°, not more than about 60°, not more than about 50°, or from about 20° to about 70°, about 30° to about 60°, or about 40° to about 50°. In contrast, conventional extrusion blow molds do not include a bead-forming surface and, consequently, define a bead extension angle of 90°.

As shown in FIG. 7, at least a portion of bead-forming surface 140a can be spaced from bead angle reference line 160 to thereby define a bead reference cross section 166 between bead-forming surface 140a and bead angle reference line 160. When at least a portion of bead surface 140a is concave, a portion of bead angle reference line 160 can be disposed between bead reference cross section 166 and parting plane 114, as shown in FIG. 7. When at least a portion of bead-forming surface 140a is convex, a portion of bead reference cross section 166 can be disposed between bead angle reference line 160 and parting line 114 (embodiment not shown in FIG. 7). According to one embodiment, the area of bead reference cross section 166 can be less than ½ times the bead surface height multiplied by its width ($\frac{1}{2} \times H_B \times W_B$) and, in some embodiment, may be not more than about 90 percent, not more than 80 percent, not more than 70 percent, or not more than 50 percent of that value.

Figure 8B:
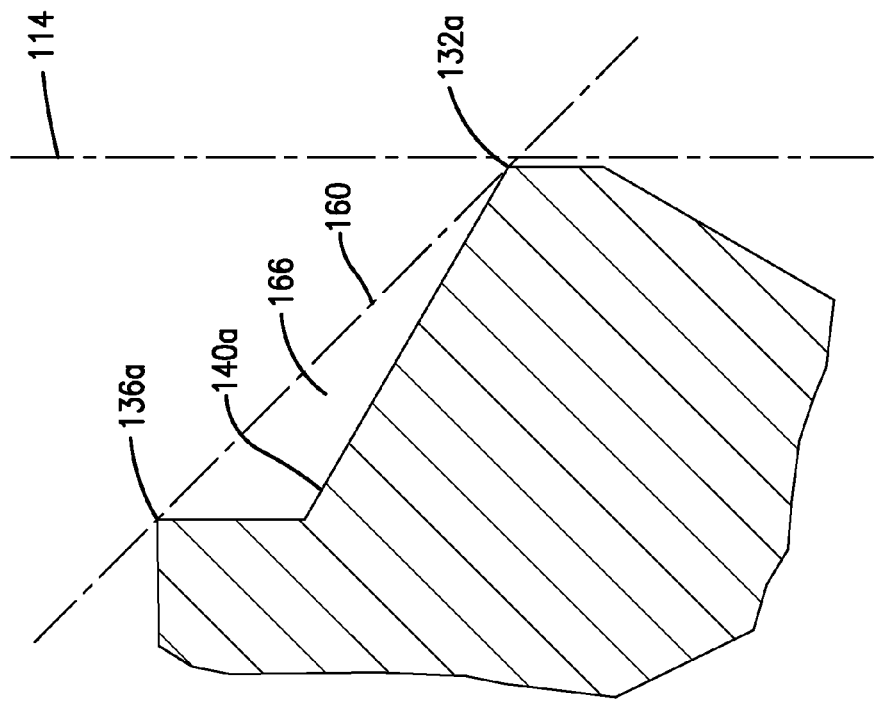
FIG. 8b is a fragmentary view of a mold assembly configured according to another embodiment of the present invention, particularly illustrating a bead-forming surface configured to define a triangular bead reference cross section.
Figure 8A:
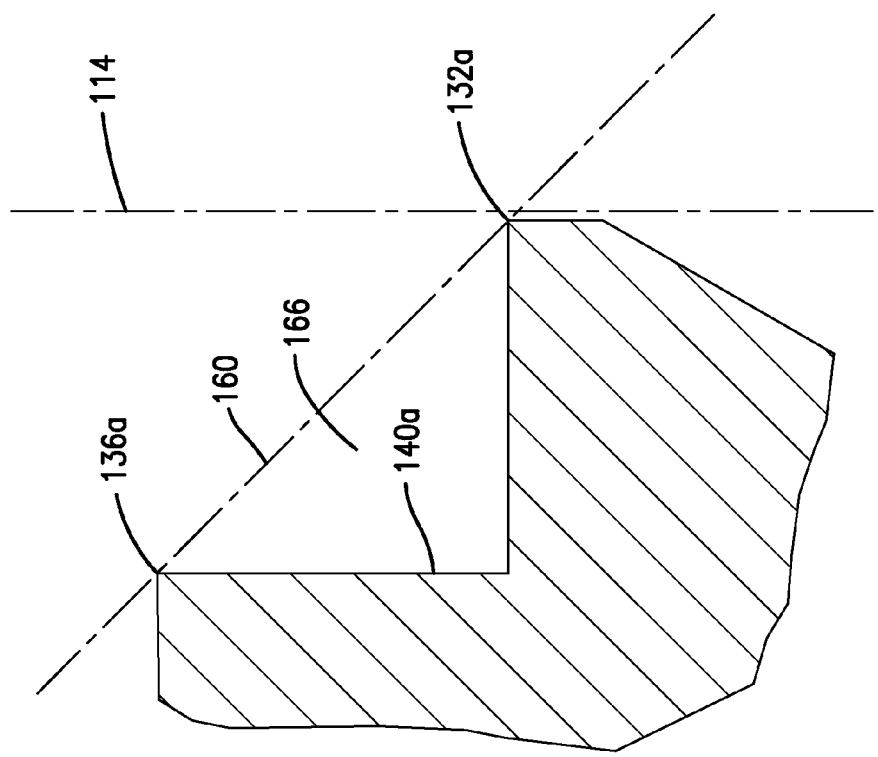
FIG. 8a is a fragmentary view of a mold assembly configured according to one embodiment of the present invention, particularly illustrating a bead-forming surface configured to define a right triangular bead reference cross section.
Figure 8D:
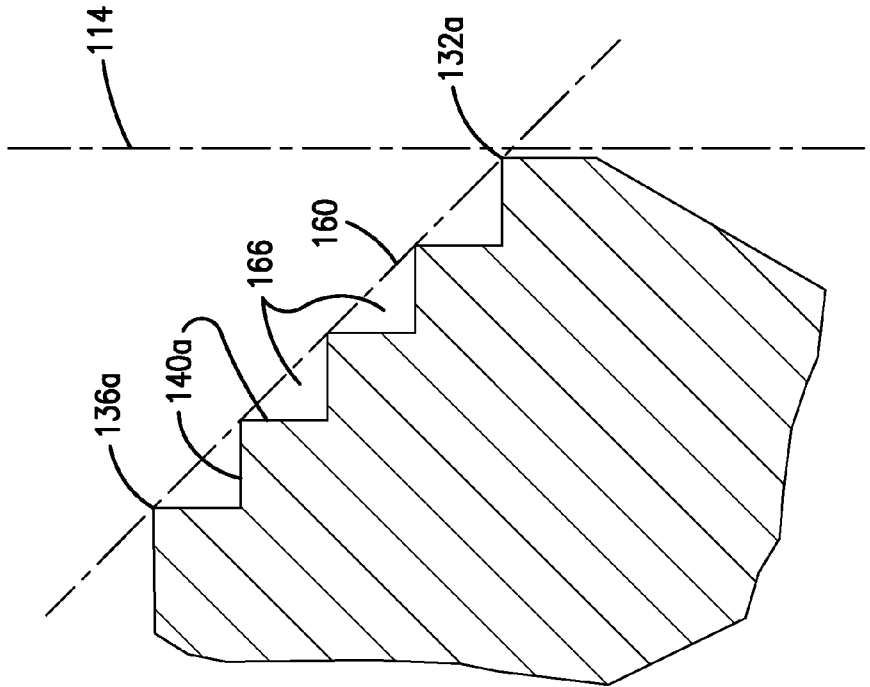
FIG. 8d is a fragmentary view a pinch region of a mold assembly configured according to still another embodiment of the present invention, particularly illustrating a bead-forming surface configured to define a stair stepped bead reference cross section.
Figure 8C:
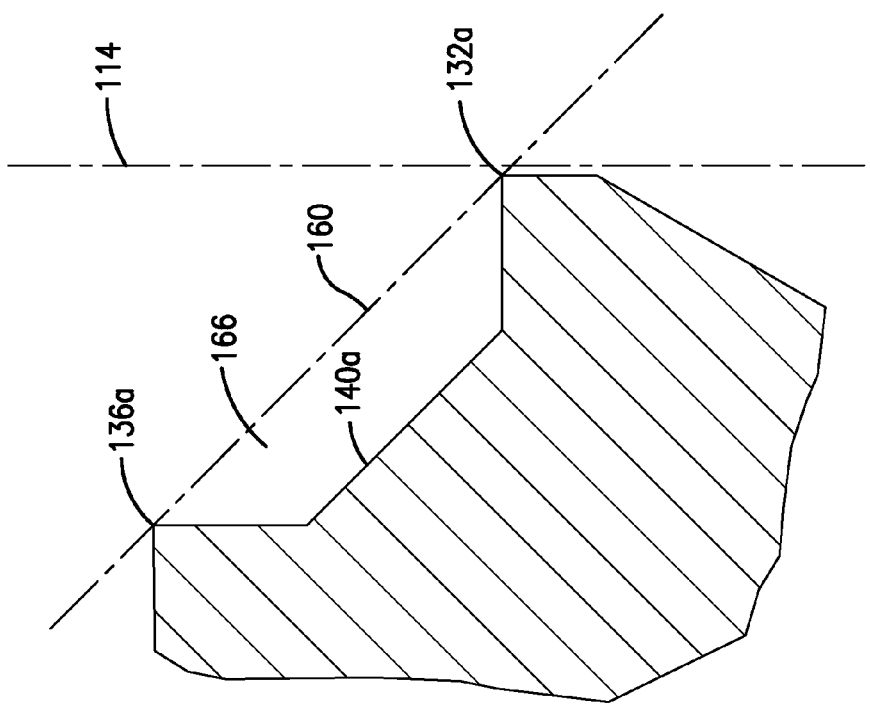
FIG. 8c is a fragmentary view of a mold assembly configured according to yet another embodiment of the present invention, particularly illustrating a bead-forming surface configured to define a polygonal bead reference cross section.

Although illustrated as being curved in FIG. 7, it is possible for bead-forming surface 140a to have a bead reference cross section 166 having a variety of different shapes, several examples of which are provided in FIGS. 8a-d. In one embodiment shown in FIG. 8a, bead reference cross section 166 can be a right triangle and, in another embodiment, bead reference cross section 166 may be triangular, but non-right triangular, as shown in FIG. 8b. In some embodiments, bead reference cross section 166 can include one or more generally straight lines connected by one or more acute (i.e., less than 90°) angles, such as, for example, when bead reference cross section 166 is shaped like one half of a n-sided polygon, wherein n is an integer between 5 and 12, inclusive. One embodiment of a polygonal bead reference cross section is illustrated in FIG. 8c, wherein bead reference cross section 166 has the shape of a half-hexagon (i.e., n=6). In some embodiment, bead reference cross section 166 may have no right angles, while, in other embodiments, bead reference cross section 166 may have at least two right angles, one example of which is illustrated by the stair-stepped cross section 166 depicted in FIG. 8d.

According to some embodiments of the present invention, at least a portion of bead-forming surface 140 can be curved between bead base line 136 and pinch line 132. As depicted in FIGS. 6a,b and 7, bead-forming surface 140 can be substantially rounded such that bead reference cross section 166 can be generally shaped like a half circle. When at least a portion of bead-forming surface 140 is curved, the radius of the curved portion, illustrated generally as R in FIG. 6a, can be at least about 0.005 inches, at least about 0.01 inches, at least about 0.02 inches and/or not more than about 0.10 inches, not more than about 0.075 inches, or not more than about 0.050 inches, or from about 0.005 to about 0.10 inches, about 0.01 to about 0.075 inches, or about 0.02 to about 0.05 inches. In some embodiments, the radius can be the same as the height of bead forming surface 140, while in other embodiments, the radius can be different than the height of bead forming surface 140.

Referring again to FIG. 6b, each of tail forming surfaces 130a,b present a pinch surface 142a,b for clamping and sealing the molten polymer during processing and a flashing surface 144a,b located adjacent each of pinch surfaces 142a, b. Each of mold halves 112a,b further defines a lower pinch line 146a,b extending along the junction of pinch surfaces 140a,b and flashing surfaces 142a,b such that each of pinch surfaces 140a,b extends between pinch lines 132a,b and lower pinch lines 146a,b. At least a portion of pinch surfaces 140a,b can be oriented substantially parallel to parting line 114, and, in one embodiment, each of pinch surfaces 140a,b can have an overall length, measured between pinch lines 132a,b and lower pinch lines 146a,b of not more than about not more than about 0.025 inches, not more than about 0.020 inches, not more than about 0.015 inches, not more than about 0.012 inches, not more than about 0.010 inches, or not more than about 0.008 inches.

As shown in FIG. 6b, a pinch point gap 150 can be defined between opposing pinch regions 118a,b of mold halves 112a,b when mold assembly 110 is in a closed configuration. In one embodiment, pinch point gap 150 can be at least about 0.001 inches, at least about 0.0020 inches, at least about 0.0025 inches and/or not more than about 0.075 inches, not more than about 0.050 inches, or not more than about 0.035 inches, measured as the shortest linear distance between opposing pinch lines 132a,b or lower pinch lines 146a,b. In another embodiment, the pinch point gap can be in the range of from about 0.001 to about 0.075 inches, about 0.002 to about 0.050 inches, or about 0.0025 to about 0.035 inches.

As pinch regions 118a,b close onto the molten parison during the molding process, excess polymer or "flashing" passes through pinch point gap 150 and into a flash pocket 148 collectively defined between opposing flashing surfaces 144a,b. As the material collected in flash pocket 148 cools, a "tail flash" is created and is formed along the base of the molded container. The tail flash (not shown in FIGS. 6a,b or FIG. 7) is ultimately removed from the container prior to its end use, as will be described in detail shortly. In one embodiment, flash pocket 148 has a length, $L_F$, of at least about 0.25 inches, at least about 1 inches, at least about 2 inch and/or not more than about 10 inches, not more than about 7 inches, or not more than about 5 inches, measured from lower pinch line 146a,b to the lower edge 158 of the mold half 112. In another embodiment, the flash pocket length can be in the range of from about 0.25 to about 10 inches, about 1 to about 7 inches, or about 2 to about 5 inches, measured as described above.

Flash pocket 148 can be configured in a variety of ways. In one embodiment, flashing surfaces 144a,b can define one or more flashing angles, such as an upper flashing angle (θ), defined between an upper reference line 152 drawn through lower pinch point 146a to intersect parting plane 114, as shown in FIG. 7, and lower flashing angle (Ø), defined between a lower reference line 154 drawn through a flashing point 147a and intersecting parting plane 114, as shown in FIG. 6. In one embodiment, upper and/or lower flashing angles θ and Ø can at least 15°, at least 20°, at least 25° and/or not more than about 60°, not more than about 50°, or not more than about 45°. In one embodiment, upper and lower flashing angles θ and Ø may be the same, while, in another embodiment, flashing angles θ and Ø may be different from one another.

Figure 9:
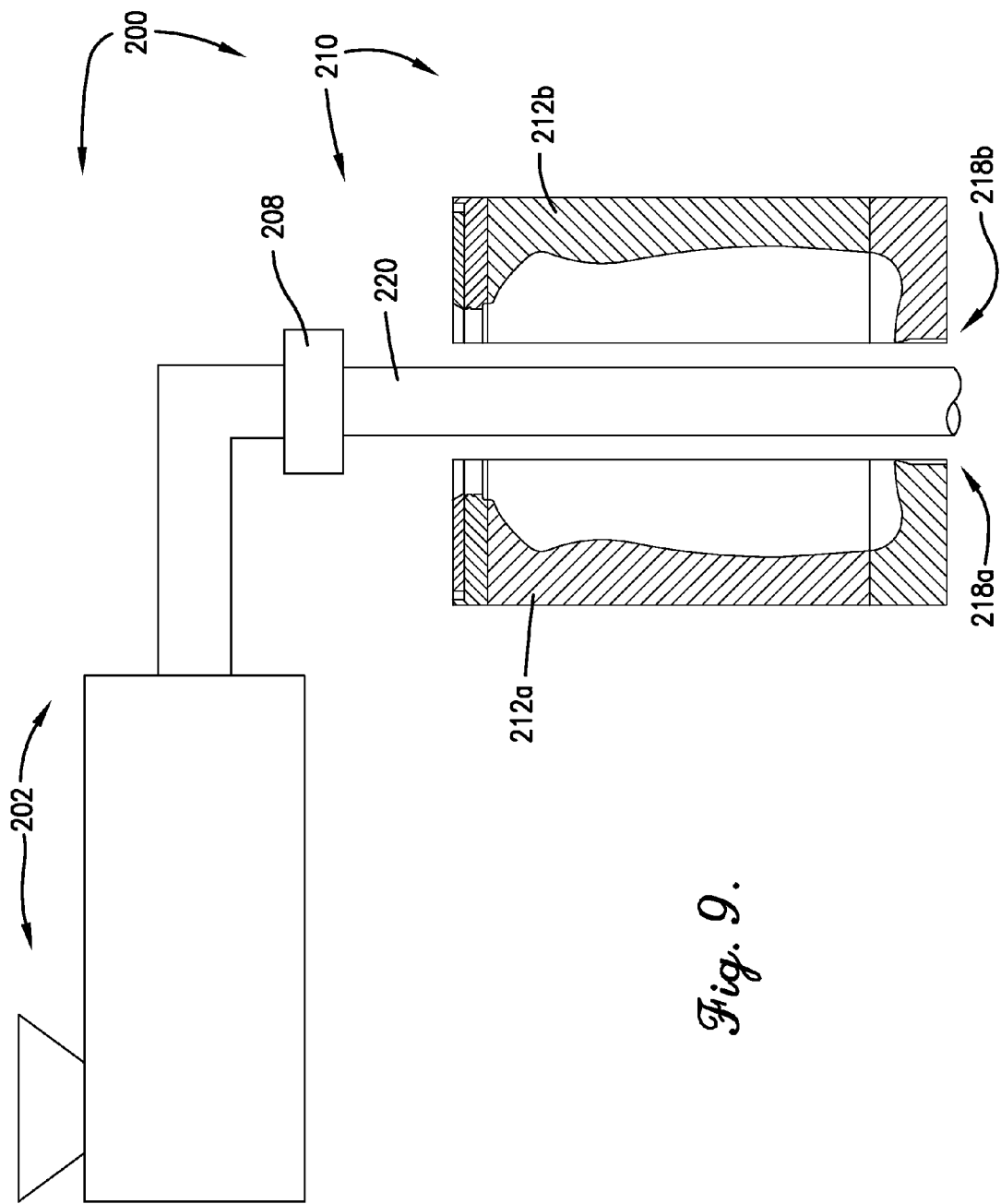
FIG. 9 is a schematic view of an extrusion blow molding (EBM) system configured according to one embodiment of the present invention, particularly illustrating the step of extruding a parison in the EBM process.
Figure 11:
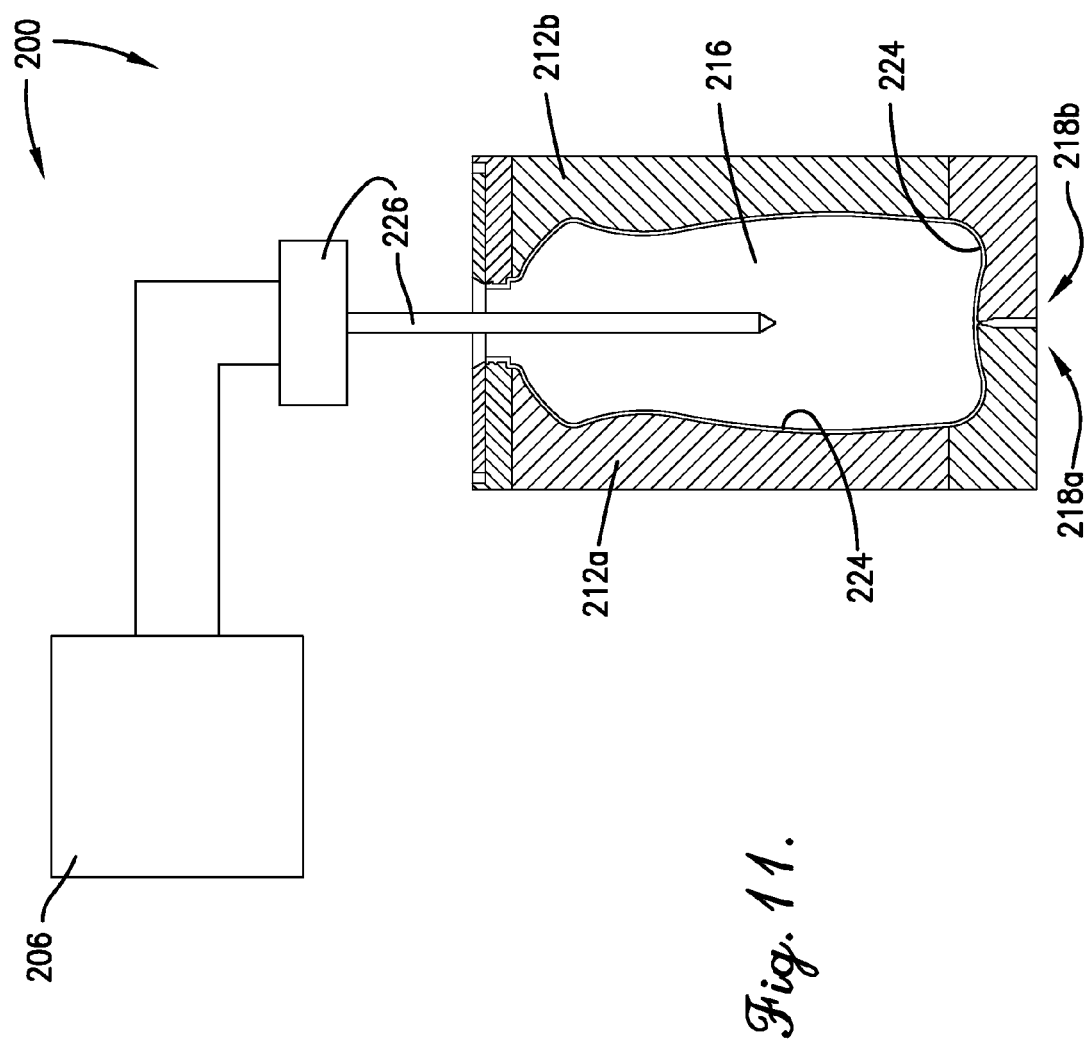
FIG. 11 is a schematic view of an EBM system configured according to one embodiment of the present invention, particularly illustrating the blowing or expansion step of the EBM process.

Turning now to FIGS. 9-11, an extrusion blow molding (EBM) system 200 suitable for forming a blow molded container, such as bottle 10, is illustrated as generally comprising an extruder 202 and a mold assembly 210. Extruder 202 is coupled to a die 208 for extruding the molten resin into a parison 220, as shown in FIG. 9. Mold assembly 210 comprises two mold halves 212a,b, which are shiftable between an open configuration wherein mold halves 212a,b are spaced apart from one another, as illustrated in FIG. 9, and a closed configuration wherein at least a portion of mold halves 212a,b contact one another along a parting plane 214, as shown in FIG. 10a. When in the closed configuration, mold halves 212a,b collectively define a mold cavity 216, which generally has the shape of the final container. Mold halves 212a,b can be configured in any suitable configuration and, in one embodiment, can include one or more of the features discussed in detail previously with respect to FIGS. 4-8.

EBM system 200 can be configured to operate using any type of blow molding process. In one embodiment, EBM system 200 can be a "shuttle" or "intermittent" process, configured to produce a "hanging" parison, as generally depicted in FIGS. 9-11. According to the shuttle EBM process, mold assembly 210 can be situated on a moving platform (not shown) for transporting the assembly up to die 208 and for closing mold halves 212a,b around parison 220. Thereafter, mold assembly 210 can move away from die 208 to inflate, cool, and eject the finished container from the assembly. Due to the mechanics of this type of process, polymer can be continuously extruded through die 208 at a relatively slow rate.

In an intermittent process, mold assembly 210 can be in a fixed location below the opening of die 208 and the full "shot weight" of polymer (i.e., the weight of the final container plus its flash) can be rapidly pushed through die 208 directly after the preceding container is ejected from mold assembly 210, but before the current container is inflated. Intermittent processes can either utilize reciprocating screw action to push the parison out of mold assembly 210, or the extrudate can be continuously extruded into a cavity which utilizes a plunger to push the parison (embodiment not shown).

EBM system 200 can also be configured to operate using a wheel process (embodiment not shown). In a wheel process, polymer is continuously extruded from the die at a relatively high speed. A 4-ft to 20-ft diameter wheel moving at about 1 to about 10 revolutions per minute grabs each parison as it is extruded from the die and lays the parison into a one of many molds attached to the outer circumference of the wheel. Mold closure, parison inflation, cooling, and ejection of the bottle occurs sequentially as the wheel turns. The parison can exit the die in either an upward or downward direction.

Turning back to the basic EBM system 200 illustrated in FIGS. 9-11, in operation, solid pellets or flakes of polymeric material are fed into the barrel of extruder 202, wherein the material melts as it passes therethrough. Extruder 202 is not limited and can be any suitable type of extruder. In one embodiment, extruder 202 can be a high speed extruder capable of delivering polymer flow rates which manifest shear rates at the die exit of at least about 450 s$^{-1}$, at least about 550 s$^{-1}$, or at least about 600 s$^{-1}$. In another embodiment, extruder 202 can be operated at a shear rate in the range of from 500 to 10,000 s$^{-1}$, 600 to 5,000 s$^{-1}$, or 700 to 2,000 s$^{-1}$. Shear rates are calculated from the equation $\ddot{Y}=8.6Q/WH^2$, where Q is the volumetric output rate through the die, W is the width of the die and H is the die gap opening height of the die. The volumetric output rate (Q) is determined by measuring the mass of material extruded over a fixed time interval and dividing by the melt density.

In one embodiment, the polymeric material introduced into extruder 202 can be a polyester or copolyester. One copolyester suitable for use in all embodiments of the present invention comprises (a) a dicarboxylic acid component comprising: (i) 90 to 100 mole % of terephthalic acid residues; (ii) 0 to 10 mole % of aromatic and/or aliphatic dicarboxylic acid residues having up to 20 carbon atoms; and (b) a glycol component comprising: (i) 88 to 93 mole % of ethylene glycol residues; and (ii) 7 to 12 mole % residues of at least one difunctional glycol chosen from 1,4-cyclohexanedimethanol, neopentyl glycol, 2,2,4,4-tetramethyl-1,3-cyclobutanediol, isosorbide, or mixtures thereof; (c) at least one branching agent in the amount ranging from 0.1 to 1.0 mole % based on the total moles of glycol residues if said branching agent has hydroxyl substituents and otherwise based on the total moles of acid residues; wherein the total mole % of the acid residues is 100 mole %, and the total mole % of the glycol residues is 100 mole %; wherein the inherent viscosity (IhV) of the polyester ranges from 0.7 to 1.1 dL/g as determined in 60/40 (wt/wt) phenol/tetrachloroethane at a concentration of 0.25 g/50 ml at 25° C. The above-described polyester material may be utilized to produce an extrusion blow molded container, at the shear rates listed above, having low sidewall haze value of less than about 15 percent, less than about 10 percent, less than about 7 percent, less than about 5 percent, or less than about 4 percent, as measured on the side wall of the bottle according to ASTM D 1003, Method A using a BYK-Gardner HazeGuard Plus. Other suitable polymers, including other polyester polymers, suitable for use in other embodiments of the present invention will be discussed in detail shortly.

In some embodiments, extruder 202 can be operated with a reverse heating profile, such that the temperature at the inlet of extruder 202 is higher than the temperature at the outlet of die 208. The temperature at the outlet of die 208 can be at least about 190° C., at least about 210° C., at least about 220° C. and/or not more than about 285° C., not more than about 275° C., or not more than about 265° C. In another embodiment, the temperature at the outlet of die 208 can be in the range of from about 190° C. to about 285° C., about 210° C. to about 275° C., or about 220° C. to about 265° C. The temperature of the molten polymer exiting the outlet of die 208, measured directly on the polymer just before blowing, can be at least about 180° C., at least about 200° C., at least about 210° C. and/or not more than about 280° C., not more than about 270° C., and/or not more than about 260° C., or in the range of from 180° C. to about 280° C., about 200° C. to about 270° C., or about 210° C. to about 260° C.

As open-ended parison 220 is clamped between opposing pinch regions 218a,b of mold halves 212a,b, a pinch point gap 250 can be formed between opposing pinch surfaces 224a,b, as shown in FIG. 10b. According to one embodiment, pinch point gap 250 can be at least about 0.001 inches, at least about 0.0015 inches, at least about 0.002 inches and/or not more than about 0.075 inches, not more than about 0.05, or not more than about 0.035 inches, measured as the shortest linear distance between pinch surfaces 224a,b. In another embodiment, the pinch point gap can be in the range of from about 0.001 to about 0.075 inches, about 0.0015 inches to about 0.05 inches, or about 0.002 to about 0.035 inches.

Once mold halves 212a,b have fully closed, air or other pressurized fluid can be injected into sealed parison 222 with an inflation device 226, as shown in FIG. 11. The resulting blow molded container can then be allowed to cool for at least about 5 seconds, at least about 8 seconds, or at least about 10 seconds and/or not more than about 45 seconds, not more than about 30 seconds, not more than about 20 seconds, not more than about 16 seconds, or not more than about 14 seconds via contact with mold halves 212a,b, which are maintained at a temperature at least about 15° C., at least about 18° C., at least about 20° C. and/or not more than about 50° C., not more than about 40° C., or not more than about 30° C. The mold cycle time can also be in the range of from about 5 to about 45 seconds, about 8 to about 30 seconds, about 10 to about 20 seconds, while the mold temperature can be maintained in the range of from about 15° C. to about 50° C., about 18° C. to about 40° C., or about 20° C. to about 30° C.

During cooling, the excess polymer that collected in flash pocket 244 disposed below pinch point gap 250 at least partially hardens, thereby creating a tail flash coupled to at least a portion of the base of the molded container. Once cooled, the initial blow molded container can be removed from mold assembly 210 and transported to a downstream deflashing zone, wherein at least a portion of the tail flash can be removed. In one embodiment, at least a portion of the transportation from mold assembly 210 to the deflashing zone (not shown) can be carried out by gripping, either manually or with a robotic device, the tail flash of the initial blow molded container.

Figure 12:
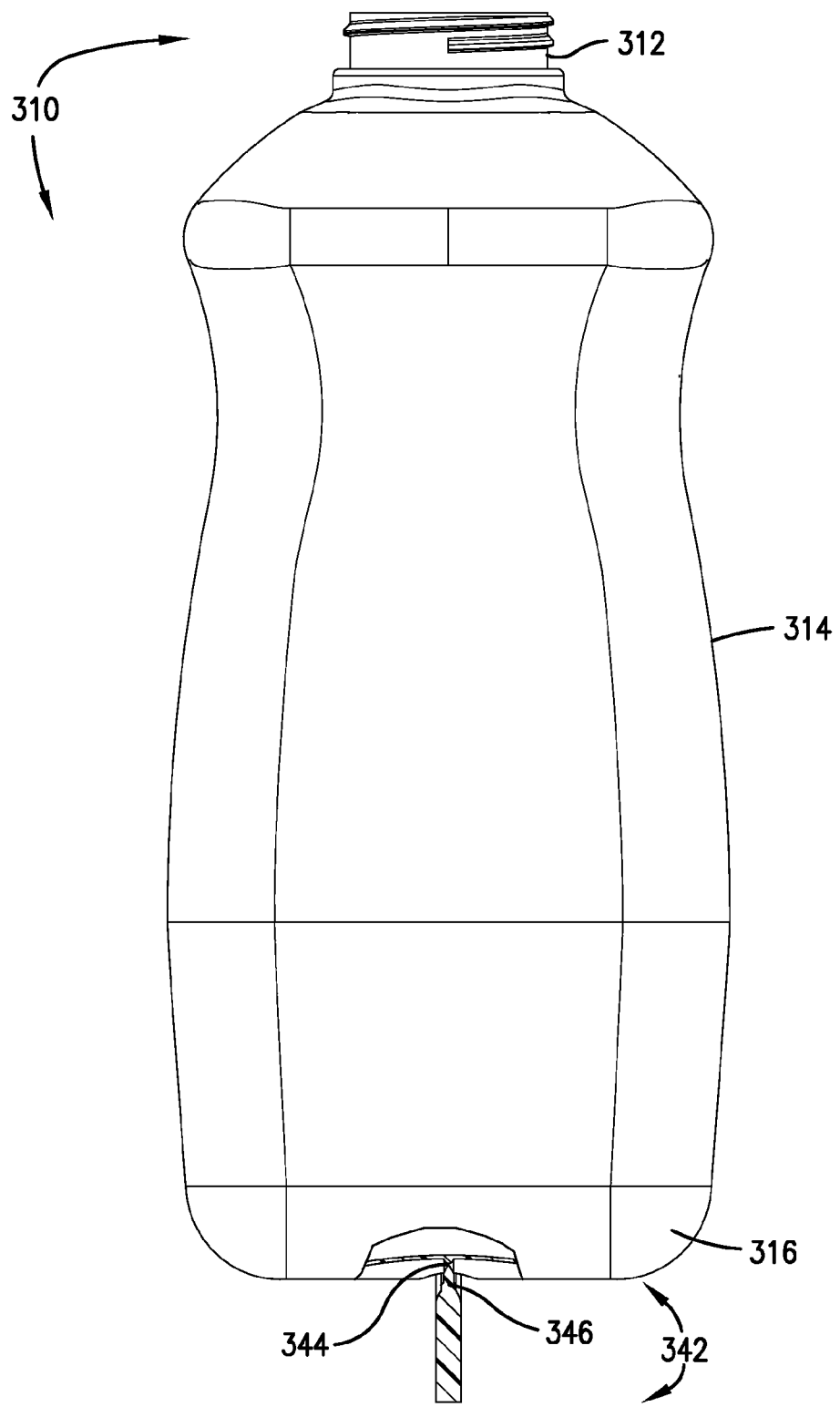
FIG. 12 is a side elevation view of a bottle having a tail flash configured according to one embodiment of the present invention.

Turning now to FIG. 12, side view of an initial extrusion blow molded bottle 310 including a tail flash 342 is provided. Bottle 310 comprises a neck 312, a body 314, a base 316, and tail flash 342 extending along at least a portion of base 316. In one embodiment, tail flash 342 comprises a support portion (or support bead) 344 coupled to base 316 of bottle 310 and an elongated portion 346 extending outwardly from support bead 344. In one embodiment, elongated portion 346 is configured for removal from support portion 344 when bottle 310 is deflashed. Support portion 344 can remain intact and, once elongated portion 346 of tail flash 342 has been removed, can have similar properties (including height, width, and height-to-width ratio) as support bead 30 of bottle 10, discussed in detail previously.

Figure 13A:
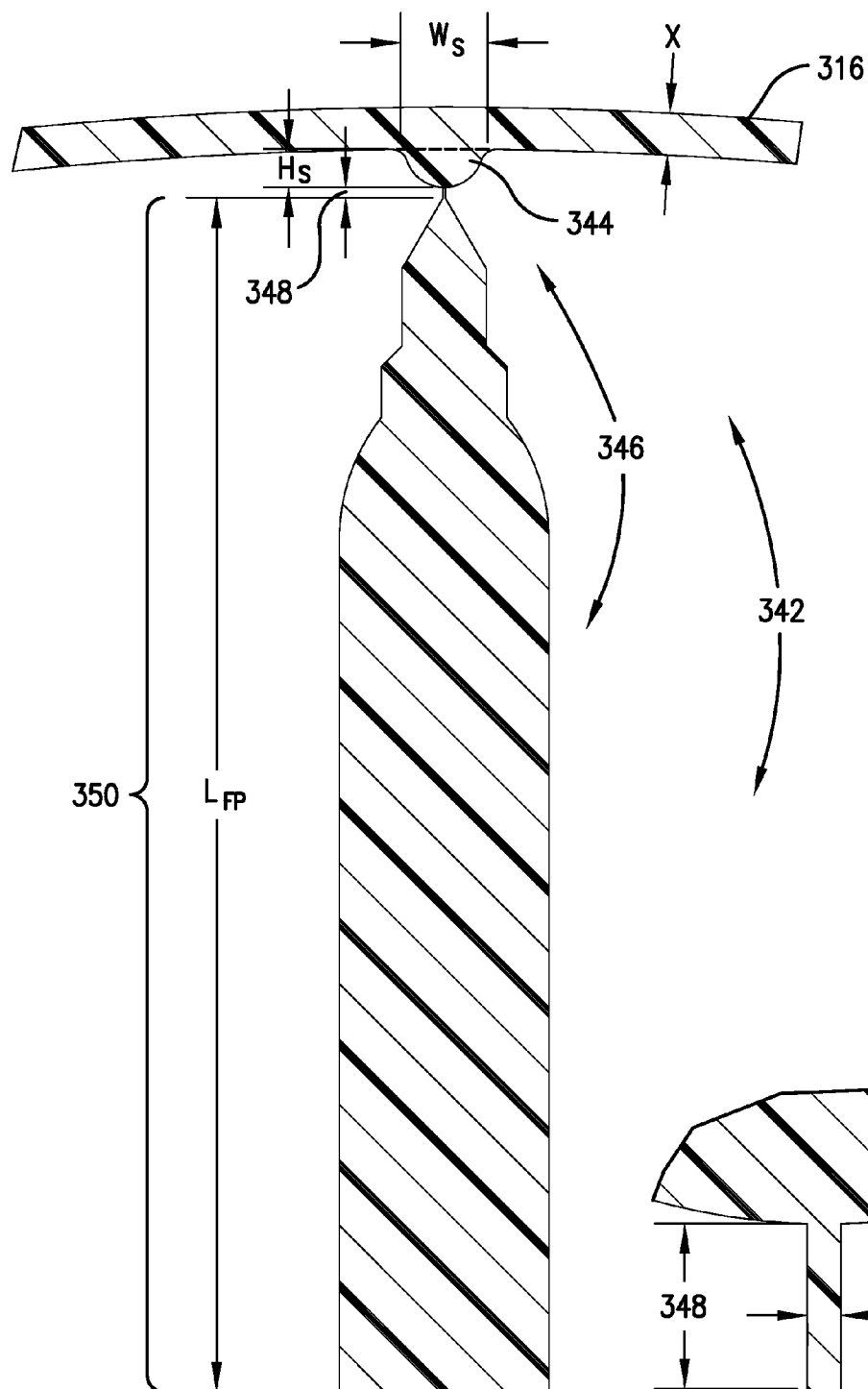
FIG. 13a is an enlarged fragmentary view of the tail flash shown in FIG. 12.
Figure 13B:
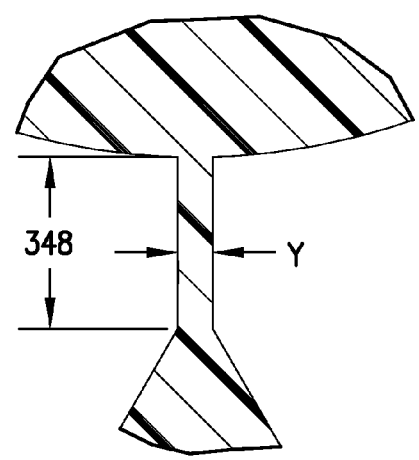

FIGS. 13a and 13b provide enlarged views of tail flash 342, including support portion (or bead) 344 and elongated portion 346. In one embodiment shown in FIG. 13a, elongated portion 346 of tail flash 342 can further comprise an upper pinch portion 348 and a lower flashing portion 350 respectively formed by the pinch point gap and flashing pocket of an EBM mold assembly (not shown) configured as discussed previously. In one embodiment, the width (Y) of pinch portion 348, as shown in FIG. 13b, can be at least about 0.001 inches, at least about 0.005 inches, or at least 0.01 inches and/or not more than 0.075 inches, not more than about 0.050 inches, or not more than about 0.035 inches, or in the range of from about 0.005 to about 0.075 inches, about 0.005 to about 0.050 inches, or about 0.01 to about 0.035 inches. As shown in FIG. 13a, the length of flashing portion 350 ($L_{FP}$) can be at least about 0.25 inches, at least about 1 inch, at least about 2 inches, or at least about 3 inch and/or not more than about 10 inches, not more than about 7 inches, or not more than about 5 inches, or in the range of from about 0.25 to about 10 inches, about 1 to about 7 inches, about 2 to about 5 inches.

Although illustrated in FIG. 13a as having a generally rounded shape, support portion 344 can have any suitable shape, including, for example, those previously discussed with respect to support bead 30. In one embodiment, the cross sectional area of support portion 344 of tail flash 342 can be equal to the height of support portion 344 times its width. In another embodiment, the cross sectional area of support portion 344 can be less than this value. For example, in one embodiment, the cross sectional area of support portion can be no more than about 90 percent, no more than about 80 percent, or no more than about 70 percent of the height of support portion 344 times its width. When support portion 344 of tail flash 342 is rounded, as shown in FIG. 13, it may have radius of at least about 0.005 inches, at least about 0.01 inches, at least about 0.02 inches and/or not more than about 0.10 inches, not more than about 0.075 inches, or not more than about 0.050 inches, or from about 0.005 to about 0.10 inches, about 0.01 to about 0.075 inches, or about 0.02 to about 0.05 inches. In some embodiments, the radius can be the same as the height of bead support portion 344, while in other embodiments, the radius can be different than the height of bead support portion 344.

Once transported to a deflashing zone (not shown in Figures) as discussed previously, at least a portion of elongated portion 346 of tail flash 342 can be mechanically removed from bottle 310 using, for example, a side knock machine or other known device. In one embodiment, at least about 80 percent, at least about 90 percent, at least about 95 percent, at least about 97 percent, or at least about 99 percent of the total length of elongated portion 346 can be removed from bottle 310, thereby leaving support portion (bead) 344 coupled to base 316 of bottle 310. During removal, elongated portion 346 can disengage or breaks away from support bead (or portion) 344 along at least a portion of the dimension Y of pinch portion 348.

Bottles and other containers produced according to various embodiments of the present invention can be easier to trim (deflash) than similar bottles produced with conventional processes and systems. For example, in one embodiment, the torque required to remove elongated portion 346 from support bead (or portion) 344 of bottle 310 can be at least about 15 percent, at least about 25 percent, at least about 35 percent, at least about 50 percent and/or not more than 100 percent, not more than about 90 percent, not more than about 80 percent, not more than about 75 percent less than the torque required to trim (or deflash) an analogous bottle that does not include a support bead, using the torque-to-deflash method described in detail in Example 2. As used herein, the phrase "analogous bottle that does not include a support bead" refers to a bottle produced in exactly the same manner as bottle 310 with the exception being that the analogous bottle does not include a support bead 344. Thus, mold assemblies used to produce the analogous bottle would not include a bead forming surface as described in detail previously with respect to FIGS. 4-8 above. In some embodiments, the torque to deflash can be in the range of about 15 to 100 percent less, about 25 to about 90 percent less, or about 35 to about 80 percent less than the torque required to deflash an analogous bottle that does not include a support bead.

The absolute value of the torque required to deflash bottle 310 can be dependent on, inter alia, the size of the bottle. Regardless of bottle size, however, bottles and other containers produced according to embodiments of the present invention can exhibit a lower specific torque to deflash than conventionally produced bottles of similar size and shape. As used herein, the term "specific torque to deflash" refers to the amount of torque (in-$lb_f$) required to trim or deflash a bottle or container normalized (divided) by the total weight (in US ounces or oz.) of the deflashed bottle or container. In one embodiment, bottle 310 can have a specific torque to deflash of not more than about 20 in-$lb_f$/oz, not more than about 18 in-$lb_f$/oz, not more than about 15 in-$lb_f$/oz, not more than about 12 in-$lb_f$/oz, not more than about 10 in-$lb_f$/oz, or not more than about 8 in-$lb_f$/oz. Specific methods for measuring torque to deflash and specific torque to deflash will be described shortly in Example 2.

In one aspect, bottles and other containers produced according to embodiments of the present invention may require far less effort to deflash than traditional blow molded containers. According to one embodiment, the absolute value of the torque required to deflash bottles of the present invention may depend on several factors, including, for example, bottle size, material, and design. In one embodiment, the torque to deflash required for a bottle having a total internal volume in the range of 80 fluid ounces (fl. oz) and 128 fl. oz. and a total deflashed mass between 50 and 200 grams, can be less than about 100 in-$lb_f$, less than about 75 in-$lb_f$, less than about 60 in-$lb_f$, less than about 50 in-$lb_f$, less than about 45 in-$lb_f$, less than about 40 in-$lb_f$, less than about 35 in-$lb_f$ or less than about 30 in-$lb_f$, measured according to the procedure provided in Example 2, below. In some embodiments, the bottle may be of similar construction to the bottle shown in FIG. 14 and/or be made of one or more of the polymeric materials discussed in detail shortly. Although described herein with reference to a support bead located along the base of a bottle or other container, it should be understood that such a bead could be utilized at any other portion of a blow molded container wherein flashing is formed during production, including, but not limited to the handle trim, the neck trim, body trim, and others. When utilized in non-base trim locations as listed herein, it is contemplated that similar reductions in torque to deflash values as compared to analogous conventional bottles would also be achievable.

Bottles and other containers produced according to embodiments of the present invention can be made of any suitable material, including, but not limited to, copolyesters, polyvinyl chloride (PVC), polyethylene, and polypropylene. In one embodiment, containers as described herein can be made from a polyolefin-based material having a flexure modulus (or stiffness), measured according to ASTM D-790, of less than about 1500 MPa. In another embodiment, the bottles may be made from a non-polyolefin material and may even be made from a polymeric material having a substantially higher modulus. For example, in one embodiment, bottles and containers of the present invention can be from a material having a flexure modulus of at least about 1550 MPa, at least about 1650 MPa, at least about 1750 MPa, at least about 1850 MPa and/or not more than about 3000 MPa, not more than about 2850 MPa, or not more than about 2650 MPa, or in the range of from about 1550 to about 3000 MPa, about 1650 to about 2850 MPa, or about 1750 to about 2650 MPa. Surprisingly, it has been discovered that even more rigid bottles produced according to embodiments of the present invention exhibit high drop impact pass rates but are also easy to deflash (or trim).

According to one embodiment, the polymeric material used to produce bottles and other containers as described herein can be a polyester material. Examples of suitable polyester materials are described in co-pending U.S. patent application Ser. No. 13/092,978 filed on Jul. 28, 2011, the entire disclosure of which is incorporated herein by reference to the extent not inconsistent with the present disclosure. As used herein, the term "polyester," refers to a synthetic polymer prepared by the reaction of one or more difunctional carboxylic acids and/or multifunctional carboxylic acids with one or more difunctional hydroxyl compounds and/or multifunctional hydroxyl compounds and is intended to encompass both homopolyesters and copolyesters.

Polyester materials suitable for use herein can include a dicarboxylic acid component and a diol component, each including one or more residues. The dicarboxylic acid component of the polyester material used herein may include at least about 85 mole percent, at least about 90 mole percent, at least about 95 mole percent, at least about 97 mole percent, or at least about 99 mole percent of residues of terephthalic acid or an ester thereof (i.e., dimethyl terephthalate), with the balance being one or more modifying residues listed below. In some embodiments, the dicarboxylic acid component may comprise 100 percent of residues of terephthalic acid or dimethyl terephthalate. When the dicarboxylic acid component does include a modifying residue, such a residue may be selected from the group consisting of isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof.

Other copolyesters suitable for use in all embodiments of the present invention comprise (i) a diacid residue of which at least 80 mole percent is a diacid residue component selected from terephthalic acid, naphthalenedicarboxylic acid, 1,4-cyclohexanedicarboxylic acid, isophthalic acid or mixtures thereof, and (ii) a diol residue of which at least 80 mole percent is a diol residue component selected from one or more diols containing 2 to about 10 carbon atoms, wherein the diacid residue component is based on 100 mole percent total diacid residues and the diol residue component is based on 100 mole percent total diol residues.

Other copolyesters suitable for use in all embodiments of the present invention comprise (i) a diacid residue of which at least 80 mole percent is a diacid residue component selected from terephthalic acid, naphthalenedicarboxylic acid, 1,4-cyclohexanedicarboxylic acid, isophthalic acid or mixtures thereof, and (ii) a diol residue of which about 50 mole percent of ethylene glycol residues and 50 mole percent 1,4-cyclohexane dimethanol residues, wherein the diacid residue component is based on 100 mole percent total diacid residues and the diol residue component is based on 100 mole percent total diol residues.

Other copolyesters suitable for use in all embodiments of the present invention comprise (i) a diacid residue of which at least 80 mole percent is a diacid residue component selected from terephthalic acid, naphthalenedicarboxylic acid, 1,4-cyclohexanedicarboxylic acid, isophthalic acid or mixtures thereof, and (ii) a diol residue of which about 50 to 100 mole percent is ethylene glycol residues and 0 to 50 mole percent of residues selected from one or more diols containing 2 to about 10 carbon atoms, wherein the diacid residue component is based on 100 mole percent total diacid residues and the diol residue component is based on 100 mole percent total diol residues.

Other copolyesters suitable for use in all embodiments of the present invention comprise (a) a dicarboxylic acid component comprising: (i) 85 to 95 mole % of terephthalic acid residues; (ii) 5 to 15 mole % of isophthalic acid residues; and (b) a glycol component comprising: (i) 90 to 100 mole % of ethylene glycol residues; and (ii) 0 to 10 mole % residues of at least one difunctional glycol chosen from 1,4-cyclohexanedimethanol, neopentyl glycol, 2,2,4,4-tetramethyl-1,3-cyclobutanediol, isosorbide, or mixtures thereof; (c) at least one branching agent in the amount ranging from 0.1 to 1.0 mole % based on the total moles of glycol residues if said branching agent has hydroxyl substituents and otherwise based on the total moles of acid residues; wherein the total mole % of the acid residues is 100 mole %, and the total mole % of the glycol residues is 100 mole %.

Other copolyesters suitable for use in all embodiments of the present invention comprise (a) a dicarboxylic acid component comprising: (i) 85 to 95 mole % of terephthalic acid residues; (ii) 5 to 15 mole % of isophthalic acid residues; and (b) a glycol component comprising: (i) 90 to 100 mole % of ethylene glycol residues; and (ii) 0 to 10 mole % residues of a diol residue component selected from one or more diols containing 2 to about 10 carbon atoms; (c) at least one branching agent in the amount ranging from 0.1 to 1.0 mole % based on the total moles of glycol residues if said branching agent has hydroxyl substituents and otherwise based on the total moles of acid residues; wherein the total mole % of the acid residues is 100 mole %, and the total mole % of the glycol residues is 100 mole %.

The diol component of the polyester selected for extrusion blow molding of containers as described herein can include at least about 50 mole percent, at least about 65 mole percent, at least about 80 mole percent, at least about 85 mole percent, at least about 88 mole percent, at least about 90 mole percent, or 100 percent of residues of ethylene glycol with one or more modifying difunctional glycols selected form the group consisting of from 1,4-cyclohexanedimethanol, neopentyl glycol, 2,2,4,4-tetramethyl-1,3-cyclobutanediol, isosorbide (CAS registration number 652-67-5), diethylene glycol, 1,2- propanediol, 1,5-pentanediol, 1,6-hexanediol, p-xylene glycol, 1,3-propanediol, 1,4-butanediol, and mixtures thereof. The selected polyester may also include at least about 0.05 mole percent, at least about 0.10 mole percent, at least about 0.20 mole percent, at least about 0.30 mole percent, or at least about 0.50 mole percent of one or more branching agents selected from the group consisting of trimellitic acid, trimellitic anhydride, trimethylolpropane, pentaerythritol, and trimethylolethane.

In one embodiment, the polyester material selected to produce blow molded articles as described herein can have an inherent viscosity (IhV) of at least 0.65 dL/g, at least about 0.70 dL/g, at least about 0.72 dL/g, at least about 0.74 dL/g, at least about 0.76 dL/g, at least about 0.78 dL/g and/or not more than about 1.10 dL/g, not more than about 1.00 dL/g, not more than about 0.95 dL/g, not more than about 0.90 dL/g, or not more than 0.85 dL/g, measured in a 60/40 (wt/wt) phenol/tetrachloroethane at a concentration of 0.25 g/50 mL at 25° C. In another embodiment, the IhV can be at in the range of from about 0.65 to about 1.10 dL/g, about 0.70 dL/g to about 1.0 dL/g, about 0.72 dL/g to about 0.90 dL/g, or about 0.76 dL/g to about 0.85 dL/g.

Polyesters suitable for use with the present invention can preferably be compatible with the overall PET recycle stream. As used herein, the phrase "compatible with the overall PET recycle stream" refers to a polyester composition that passes the DSC melting temperature requirement of the Association of Post Consumer Plastic Recycler's published test method. As actual recycle streams of PET may have variability, testing for compatibility with the overall PET recycle stream is done using a virgin PET Recycle Standard resin. The PET Recycle Standard resin is defined herein as a PET resin comprising 96 to 99.5 mole percent terephthalic acid residues and 0.5 to 4.0 mole percent isophthalic acid residues and 100 mole percent ethylene glycol residues based upon 100 mole percent acid residues and 100 mole percent glycol residues (as PET polyesters may contain a small amount of diethylene glycol produced in situ or added to maintain a constant minimal amount of diethylene glycol, the diethylene glycol is counted as part of the 100 mole percent of ethylene glycol). The Association of Postconsumer Plastic Recyclers has developed the PET Critical Guidance Document ("CGD") for evaluating the compatibility of innovation polyesters with the PET recycle stream. The PET Recycle Standard resin defined above includes, but is not limited to, the named PET Control Resins listed in the CGD and reproduced in Table 1, below.

TABLE 1

PET Control Resins Listed in CGD for Testing Compatibility

| Named PET Control Resins for Low IV, water bottle applications | Named PET Control Resins for CSD and non-water bottle applications |
|---|---|
| Eastman aqua PET RH314 | Eastman PET CB12 |
| Invista Polyclear Splash, 3301 | Invista Polyclear Refresh, 1101 |
| M&G Cleartuf Turbo II | M&G Cleartuf MAX |
| Wellman HP 807 | Wellman HP 806 |
| DAK Lasar + W L44A | DAK Laser + B95A |

The CGD includes a procedure for preparing blend samples of a resin to be tested and one of several named PET Control resins. The Recycle Sample Prep Protocol is based upon, but not limited to, the CGD procedure. The Recycle Sample Prep Protocol is the procedure by which a polyester and a Standard PET Recycle resin are combined and processed before measuring the melting point temperature. The Recycle Sample Prep Protocol is defined as the following method: The test polyester and a control PET resin are independently dried, extruded, re-pelletized, and crystallized. Extrusion processing is conducted according to typical PET processing conditions (240-280° C. barrel temperature settings). Crystallization is conducted at approximately 160° C. Next, a pellet-pellet blend is formed by combining the re-pelletized test polyester and the re-pelletized control PET resin from the first step. The blend is dried at 160° C. for at least 4 hours. The dry blend from Step 2 is extruded, re-pelletized, and crystallized. Extrusion processing is conducted according to typical PET processing conditions (240 to 280° C. barrel temperature settings). Crystallization is conducted at approximately 160° C. The crystallized blend from the previous step is solid-stated at a temperature between 195 and 215° C. until a nominal 0.80 dL/g intrinsic viscosity (ItV) is obtained as measured by ASTM D 4603. Finally, a DSC melting point temperature measurement is conducted on the solid-stated blend the previous step at 10° C./min, on the second heat scan following annealing for 2 minutes at 280° C.

When the control PET resin is one of the named PET Control Resins listed in the CGD and blended with an innovative resin (test polyester) at a level of 0 weight percent, 25 weight percent, or 50 weight percent of the innovative resin, the melting point temperature ($T_m$) of the blend follows the CGD test, 3.1 Melting Point Test, which lists a critical value of 235° C. to 255° C. for the melting point temperature. The control PET resin can be the PET Recycle Standard resin as defined herein above, and the test polyesters can be polyesters useful in embodiments of the present invention.

In one embodiment the melting point temperature, $T_m$, of a blend comprising 50 weight percent of polyesters useful for the invention with 50 weight percent of a PET Recycle Standard resin and prepared according to the above Recycle Sample Prep Protocol of at least about 200° C., at least about 210° C., at least about 220° C., at least about 230° C., at least about 235° C. and/or not more than about 270° C., not more than about 260° C., not more than about 255° C., not more than about 250° C., not more than about 245° C., not more than about 240° C., or not more than about 230° C., or in the range of from about 200° C. to about 270° C., about 210° C. to about 260° C., about 220° C. to about 255° C., about 230° C. to about 250° C. or about 235° C. to about 245° C.

In some embodiments, the polymeric material can be selected to form a transparent bottle or container having a sidewall haze value of less than about 15 percent, less than about 10 percent, less than about 7 percent, less than about 5 percent, or less than about 4 percent, as measured on the side wall of the bottle according to ASTM D 1003, Method A using a BYK-Gardner HazeGuard Plus. Bottles and containers produced as described herein can be formed from two or more separate layers of polymeric material (e.g., be multilayer containers) or can be prepared from one layer of polymer (e.g., a single layer container), as generally described herein.

Bottles and containers produced according to embodiments of the present invention can be of any suitable shape, size, and volume. In one embodiment, the blow molded containers produced herein can have a total internal volume of at least about 6 fluid ounces (fl. oz.), at least about 8 fl. oz., at least about 16 fl. oz., at least about 32 fl. oz, or at least about 40 fl. oz., at least about 60 fl. oz., at least about 80 fl. oz. and/or not more than about 300 fl. oz., not more than about 256 fl. oz., not more than about 200 fl. oz., not more than about 128 fl. oz., or not more than about 96 fl. oz. In another embodiment, the volume of the bottles or containers described herein can be in the range of from about 6 to about 300 fl. oz, about 32 to about 256 fl. oz., or about 40 to about 128 fl. oz. In another embodiment, bottles or containers produced herein can have a final (deflashed) weight of at least about 50 grams, at least about 75 grams, at least about 100 grams and/or not more than about 450 grams, not more than about 300 grams, not more than about 200 grams, or not more than about 150 grams, or in the range of from about 50 to about 450 grams, about 75 to about 300 grams, or about 100 to about 250 grams.

The following Examples are included to highlight one or more aspects of the present invention discussed above, and are intended to be purely exemplary of the invention and are not intended to limit the scope thereof. Unless indicated otherwise, parts are parts by weight, temperature is in ° C. or is at room temperature, and pressure is at or near atmospheric.

EXAMPLES

Example 1

Preparation of Various Bottles from a Polyester Material

Figure 15A:
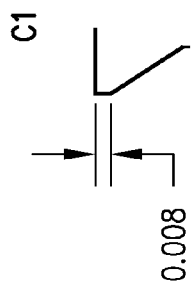
FIG. 15a is a schematic view of the pinch region of a comparative mold assembly used to form bottles in Example 1.
Figure 15B:
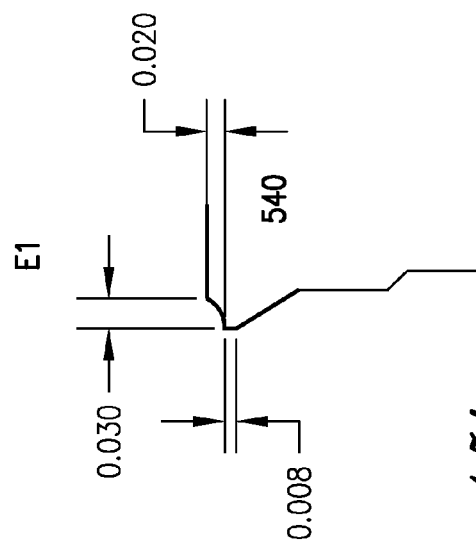
FIG. 15b is a schematic view of the pinch region of an inventive mold assembly used to form bottles in Example 1.
Figure 14:
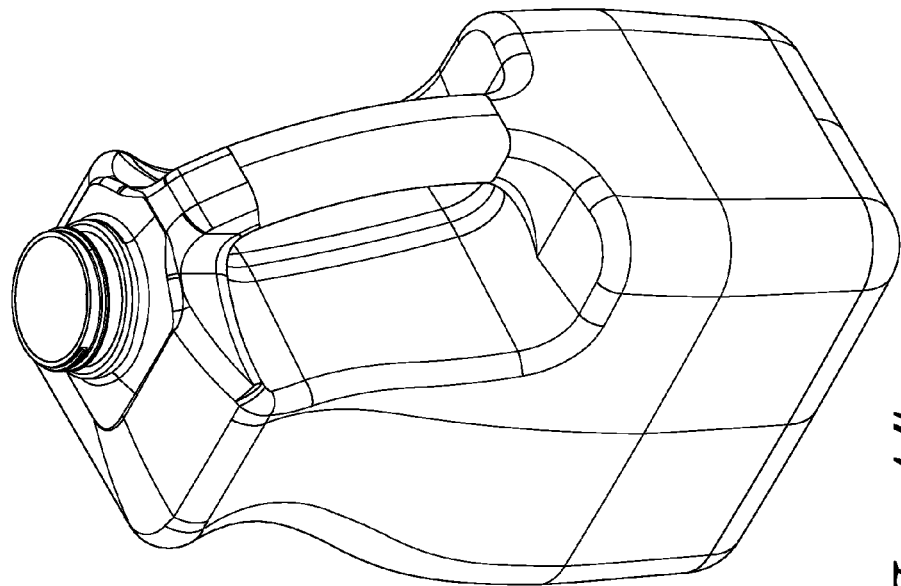
FIG. 14 is a perspective view of a through handle bottle produced as described in Example 1.

In this Example, two mold assemblies having different pinch geometries were used to produce several 89-oz handleware bottles, similar to the bottle depicted in FIG. 14. As shown in FIG. 15b, the inventive mold assembly, E1, included a curvilinear bead-forming surface having height of 0.02 inches and a width of 0.03 inches. The length of the pinch surface was 0.008 inches. While the pinch surface length of the comparative mold assembly, C1, was the same as the pinch surface length for mold assembly E1, mold assembly C1 did not include a bead-forming surface, as shown in FIG. 15a.

Pellets of a polyester polymer having a dicarboxylic acid component that included 99.7 mole percent terephthalic acid and 0.3 mole percent trimetallic anhydride (TMA) and a diol component including 90.5 mole percent ethylene glycol and 9.5 mole percent 1,4-cyclohexanedimethanol were dried for 12 hours at a temperature of 65° C. The pellets, which had an inherent viscosity (IhV) of 0.77, a melting temperature of 225° C., and flexural modulus of 2225 MPa as measured by ASTM D790, were then processed in an 80 mm Bekum H-121 continuous extrusion blow molding machine fitted with a Barr ET barrier screw. The die bushing and mandrel pin tooling were sized at 70 mm and 68 mm (outer diameter), respectively. During extrusion of the polymer, the extruder screw rotated at between 12 and 14 revolutions per minute and the temperature of the 5-zone barrel and die head were controlled between 230° C. and 260° C. The temperature of the polyester melt measured directly on the extrudate at the exit of the die, prior to blowing, was maintained at 252° C.

To produce a bottle, the molten polyester was extruded from the die and the resulting parison was closed into one of the two mold assemblies described above. For each bottle, the mold cushion was controlled to a setting of 7, but the distance between the two mold halves was varied by placing shim inserts on each side of the mold at a vertical location close to the mold base. By varying the thickness of the shims for each bottle, the width of the pinch portion of the tail flash was also modified (width "Y" showing by 348 in FIG. 13 b). Multiple bottles were produced for each of several mold spacings between 0.014 inches and 0.030 inches using both comparative mold assembly C1 and inventive mold assembly E1. In addition, mold cycle times for each type of bottle were also varied between 13 and 14.5 seconds. A summary of the mold type, mold spacing, and cycle time for each type of bottle produced is provided in Table 3, below.

Several bottles from each set listed in Table 3, below, were produced. Once removed from the mold, several of each set of bottles were mechanically trimmed using a Model HD54 Double Station Deflash Seajay trim unit. Air to the deflash unit was maintained at 100 psi. One tooling nest station was constructed to remove the tail flash, while a second nest station was established to remove flash from the upper neck portion and handle portion in the body of the bottle. The time between blowing and deflashing was maintained between 6 and 8 seconds. In some instances, when the bottle did not easily deflash, pressurized air was blown directly onto the base-tail flash interface to promote additional cooling. The duration of this additional air cooling, if any, is also recorded in Table 3.

Schematic cross sections of the lower region of two deflashed bottles produced using mold assemblies E1 and C1 are respectively depicted in FIGS. 16a and 16b. As shown in FIG. 16a, bottles produced with inventive mold assembly E1 include a support bead located proximate the base of the container. The height and width of the support bead for several types of inventive bottles were measured via microscopy. In addition, as the mold spacings were adjusted during various trial runs, the distance between pinch surfaces (e.g., the "pinch off distance") of the bottles varied as well. Table 2, below, also provides the "pinch off distance" for several types of inventive and comparative bottles were measured via microscopy. In addition, the ratios of bead height to bead width for several inventive samples were also calculated. The results are summarized in Table 2, below.

TABLE 2

Summary of Pinch Region Dimensions for Several Bottles

| Mold Assembly | Mold Spacing (in) | Mold Cycle Time (s) | Pinch-off Distance (in) | Bead Height (in) | Bead Width (in) | H:W Ratio |
| --- | --- | --- | --- | --- | --- | --- |
| C1 | 0.020 | 13 | 0.0071 | — | — | — |
| C1 | 0.028 | 13 | 0.0084 | — | — | — |
| C1 | 0.030 | 13 | 0.0098 | — | — | — |
| E1 | 0.014 | 13 | 0.0062 | 0.018 | 0.067 | 0.27 |
| E1 | 0.020 | 13 | 0.0070 | 0.018 | 0.075 | 0.24 |
| E1 | 0.022 | 13 | 0.0079 | 0.024 | 0.079 | 0.30 |

Example 2

Measurement of Torque Required to Deflash

Several bottles of set listed in Table 3 below were not trimmed as described above. Instead, these bottles were used to measure the effort (torque) required to remove the tail flash using the following procedure. Once removed from the mold, the bottle, still including its tail flash, was placed into a custom built holding fixture designed to prevent movement during trimming. The base of the bottle was positioned to protrude outwardly from the fixture by approximately one inch and the handle was oriented toward the right side of the test apparatus. A pair of locking pliers was then clamped to the tail flash of the bottle at a location adjacent the base parting seam. A Snap-On Tools Model TE12FU Torque-O-Meter torque wrench was attached to the pliers using a 3/16 inch welded nut. The torque wrench was configured such that the handle was oriented to the one o'clock position.

After the bottle was allowed to cool for a total of 15 seconds, a slow, steady pressure was applied to the wrench in a clockwise direction until the tail flash broke away from the base of the bottle. At that point, the value displayed by the torque wrench dial was recorded as the "torque to deflash" for the specific bottle being tested. The above-described procedure was then repeated an additional eleven times for each type of bottle tested and the average value of the twelve total trials was reported as the torque to deflash listed in Table 3.

the 4-foot drop height, bottle 2 was dropped at a height of 3 feet. Similarly, the passage or failure of bottle 2 at its drop height determined the height at which bottle 3 was dropped—e.g., at a one-foot increment above (if bottle 2 passed) or below (if bottle 2 failed) the drop height of bottle 2. The pattern continued in this "staircase" fashion until all 10 bottles had been dropped. The process was repeated with the

TABLE 3

Summary of Extrusion Blow Molded Bottles Produced and Tested in Examples 1-4

| Mold Assembly | Mold Spacing (in) | Mold Cycle Time (s) | Air Cool Time (s) | Torque to Deflash (in-lb$_f$) | Static Drop Impact Pass Rate | | | Bruceton Staircase Drop |
|---|---|---|---|---|---|---|---|---|
| | | | | | % Pass at 3 ft. | % Pass at 4 ft. | % Pass at 5 ft. | Average Drop Height (ft.) |
| C1 | 0.018 | 13 | 0 | 49 | 45 | 20 | 10 | 2.5 ± 0.8 |
| C1 | 0.020 | 13 | 10 | 50 | 55 | 30 | 10 | 3.9 ± 0.8 |
| C1 | 0.022 | 13 | 10 | 63 | 75 | 65 | 30 | 4.4 ± 1.7 |
| C1 | 0.024 | 13 | 10 | 90 | 90 | 75 | 50 | 5.5 ± 1.2 |
| C1 | 0.026 | 13 | 10 | 64 | 95 | 70 | 50 | 6.8 ± 2.0 |
| C1 | 0.028 | 13 | 10 | 106 | 90 | 85 | 50 | 7.7 ± 1.5 |
| C1 | 0.030 | 13 | 12 | 81 | 90 | 90 | 65 | 5.4 ± 1.8 |
| C1 | 0.017 | 14.5 | 0 | 22 | 40 | 0 | 0 | 2.6 ± 1.1 |
| C1 | 0.020 | 14.5 | 4 | 45 | 50 | 30 | 20 | 2.4 ± 1.4 |
| C1 | 0.022 | 14.5 | 8 | 51 | 65 | 30 | 15 | 4.2 ± 1.4 |
| C1 | 0.024 | 14.5 | 0 | 18 | 20 | 0 | 0 | 1.3 ± 1.1 |
| C1 | 0.024 | 14.5 | 8 | 71 | 85 | 50 | 5 | 5.5 ± 2.3 |
| C1 | 0.026 | 14.5 | 9 | 82 | 100 | 85 | 40 | 6.9 ± 2.2 |
| C1 | 0.028 | 14.5 | 8 | 79 | 80 | 35 | 15 | 5.1 ± 1.1 |
| C1 | 0.030 | 14.5 | 12 | 101 | 95 | 80 | 50 | 6.5 ± 1.7 |
| E1 | 0.014 | 13 | 0 | 0 | 90 | 70 | 35 | 5.6 ± 1.8 |
| E1 | 0.016 | 13 | 0 | 13 | 90 | 65 | 55 | 6.5 ± 1.9 |
| E1 | 0.018 | 13 | 0 | 13 | 85 | 85 | 80 | 5.9 ± 0.7 |
| E1 | 0.020 | 13 | 0 | 25 | 75 | 55 | 45 | 5.0 ± 1.4 |
| E1 | 0.022 | 13 | 0 | 34 | 55 | 40 | 30 | 3.8 ± 0.7 |
| E1 | 0.024 | 13 | 4 | 66 | 45 | 35 | 20 | 3.5 ± 0.9 |
| E1 | 0.014 | 14.5 | 0 | 1 | 85 | 50 | 45 | 6.5 ± 1.1 |
| E1 | 0.016 | 14.5 | 0 | 7 | 95 | 75 | 60 | 6.1 ± 1.1 |
| E1 | 0.018 | 14.5 | 0 | 16 | 95 | 75 | 55 | 8.8 ± 0.6 |
| E1 | 0.020 | 14.5 | 0 | 27 | 75 | 60 | 45 | 5.5 ± 2.6 |
| E1 | 0.022 | 14.5 | 2 | 42 | 20 | 10 | 10 | 5.4 ± 2.1 |
| E1 | 0.024 | 14.5 | 2 | 41 | 15 | 10 | 5 | 3.0 ± 1.3 |

Example 3

Measuring Drop Impact Strength (Bruceton Staircase Test)

The following drop impact test procedure is similar to the one provided in ASTM Method D2463. However, the procedure below was altered to eliminate bias that may result from the orientation of a handled bottle and to utilize a starting height (e.g., 4 ft.) and height increment (e.g., 1 ft) more suited for the size and shape of an 89 oz. test bottle.

The following procedure was repeated for each type of bottle listed in Table 3 above. Twenty bottles of each set were filled with room temperature water. Beginning with one subset of ten bottles, the first bottle (e.g., bottle 1 of 10) was positioned on a swing-away platform ledge with variable height adjustment, as schematically depicted in FIG. 17. Each of the first ten of the bottles tested were oriented on the platform with the handle facing outwardly (i.e., away from the hinge of the platform as shown in FIG. 17) and each of the second set of ten bottles were oriented with the handle facing inwardly (i.e., toward the hinge of the platform).

Beginning with the first set of 10, the first bottle was dropped from a height of 4 feet. If the bottle did not crack, break, or otherwise split, it passed. If the bottle 1 passed the 4-foot drop height, the second bottle (e.g., bottle 2 of 10) was dropped at a height of 5 feet. However, if the bottle 1 failed at second set of ten bottles having an inwardly facing handle orientation as described above.

Once all twenty bottles had been dropped, the average failure height was determined by adding failure heights of each bottle, dividing the result by the total number of failures, and subtracting one half of the test increment (e.g., 0.5 feet). The resulting values for each type of bottle was determined and the results are listed in listed in Table 3, above.

Example 4

Measuring Drop Impact Strength (Static Drop Test)

Twenty additional bottles of each type listed in Table 3, above, were filled with room temperature water. The filled bottles were then individually dropped from a height of 3 feet using the same swing-away platform ledge with variable height adjustment as shown in FIG. 17 and described in Example 3. Similarly to the above-described procedure, ten of the bottles for each type were dropped with the handle oriented outwardly, while the other ten were dropped with the handle oriented inwardly.

For this drop impact test, if the individual bottle did not break, crack, or otherwise split after being dropped onto the metal platform below, the bottle "passed" the height from which it was dropped. If a bottle passed the initial 3-foot height, the same bottle was then dropped from a height of 4 feet and, if passed from that height, was then dropped from a 5-foot height. The percentage of the 20 bottles for each bottle type that passed at each of the 3-, 4-, and 5-foot drop heights is recorded in Table 3, above.

Analysis of Data Obtained in Examples 2-4

As shown in Table 3, for narrower mold spacings (e.g., those less than about 0.022 inches), bottles produced with inventive mold assembly E1 generally exhibited higher drop impact pass rates and average drop heights than bottles produced with comparative mold assembly C1, for the same mold spacing and cycle time. However, at higher mold spacings above about 0.024 inches, bottles produced with comparative mold assembly C1 tended to exhibit better drop impact performance than those produced with inventive mold assembly E1. Although not wishing to be bound by theory, it is hypothesized that when wider mold spacings were utilized with inventive mold E1, resulting thicker support bead was actually deleterious to the impact performance of the bottle, especially when produced from a polyester material as described in Example 1.

However, as evidenced by the torque to deflash data provided in Table 3, bottles, both comparative and inventive, produced using wider mold spacings were generally more difficult to trim than bottles produced with narrow mold spacings. Similarly, bottles having a 13-second cycle time also tended to exhibit lower torque to deflash values than those bottles, both comparative and inventive, produced with a 14.5-second cycle time. However, for a given mold spacing and cycle time, inventive bottles produced using mold assembly E1 tended to require less torque to deflash than bottles produced using comparative mold assembly C1, thereby indicating that the inventive bottles were easier to trim than those produced with the comparative mold.

Figure 18:
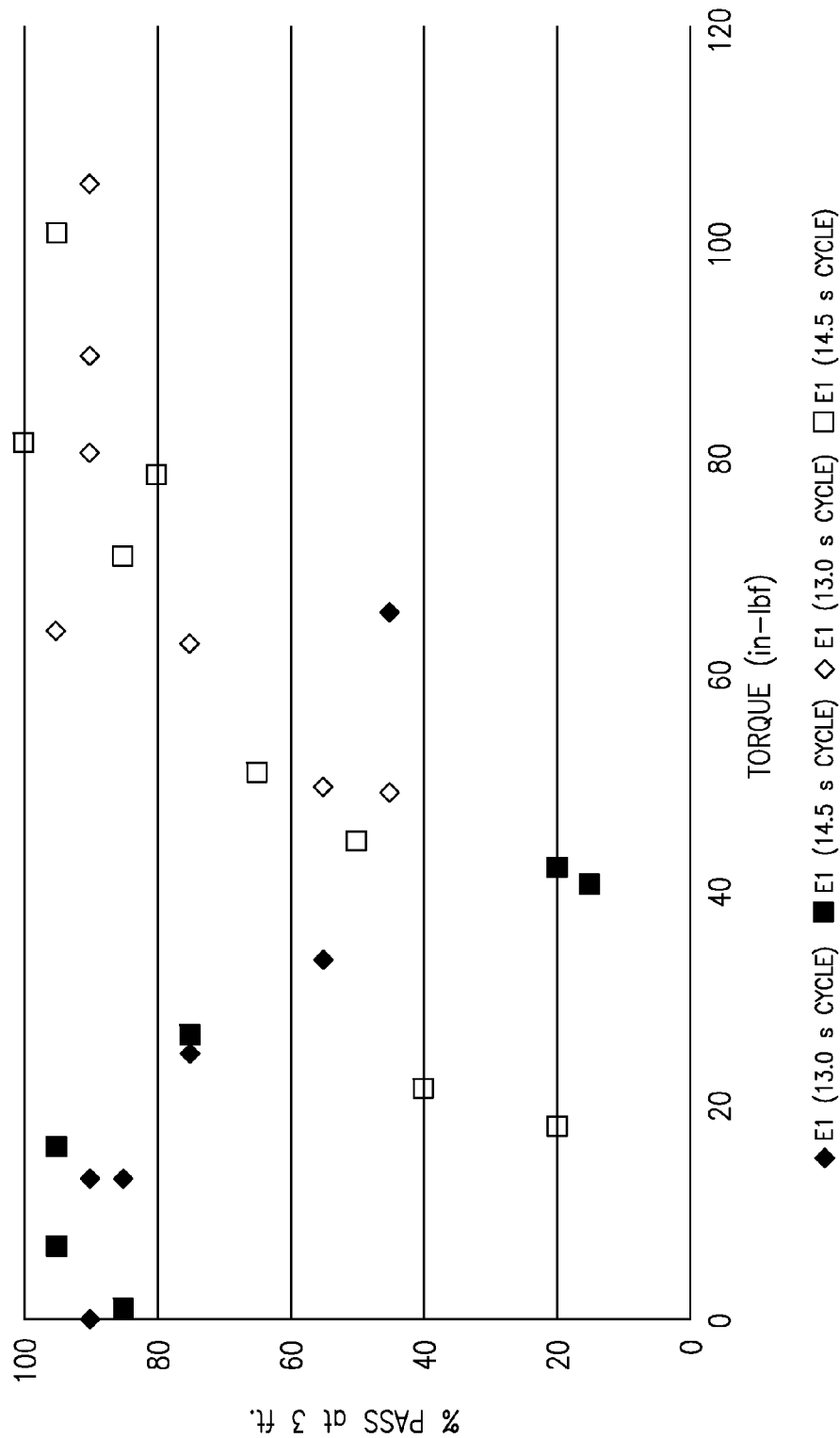
FIG. 18 is a graph showing the 3-foot drop impact pass rate versus torque required to deflash for several bottles produced using both the comparative and inventive mold assemblies illustrated in part in FIGS. 15a and 15b.
Figure 19:
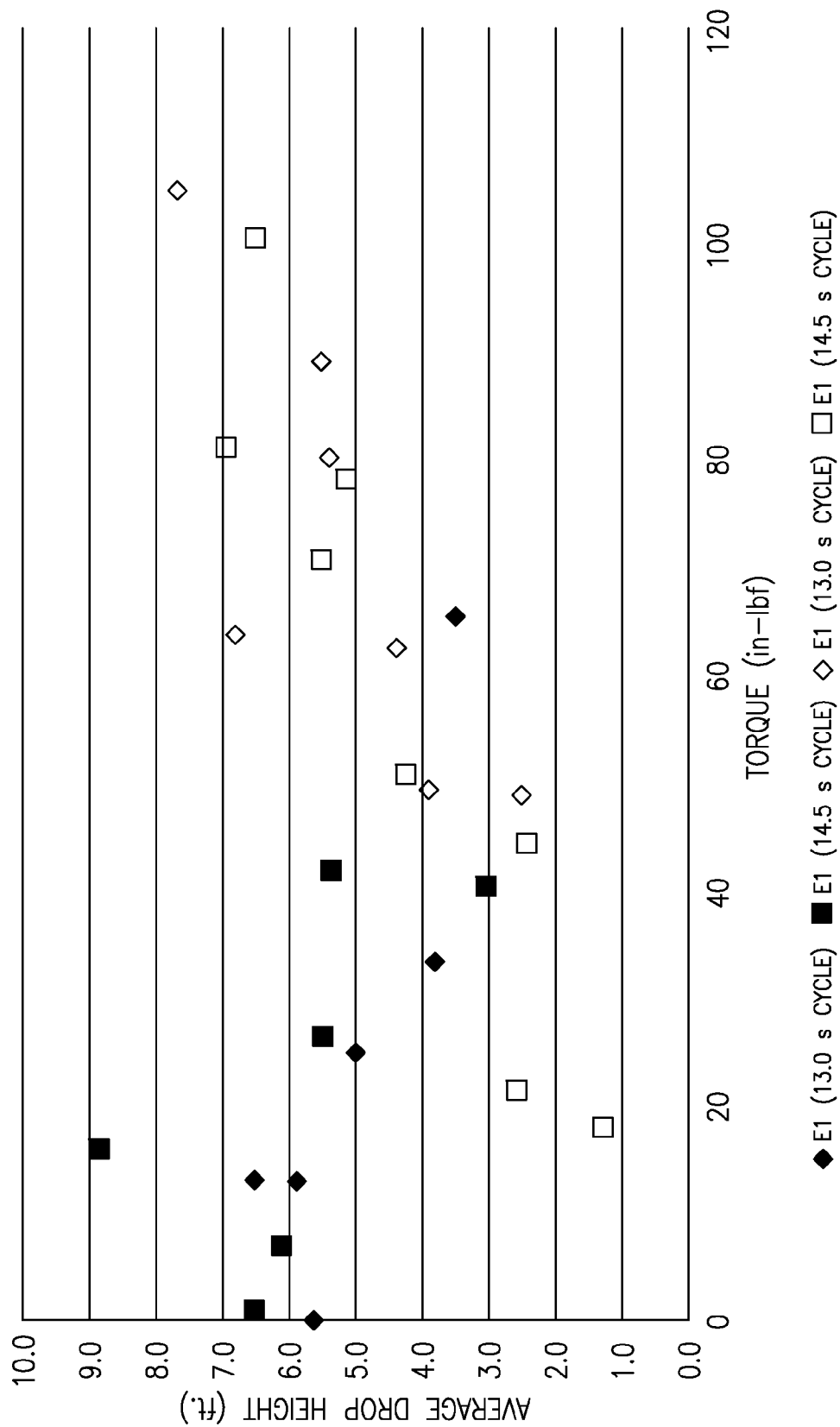
FIG. 19 is a graph showing the average drop height versus torque required to deflash for several bottles produced using comparative and inventive mold assemblies illustrated in part in FIGS. 15a and 15b.

FIGS. 18 and 19, respectively, correlate the drop impact strength and the average drop height versus the torque to deflash of each of the inventive and comparative bottles tested in Examples 2-4. As evidenced by the concentration of inventive data on the left-hand side of the graphs in FIGS. 18 and 19, bottles produced with inventive mold assembly E1 possess the desirable combination of increased strength (e.g., high average drop height of greater than 6 feet and high 3-foot pass rate greater than 80 percent) and greater ease of trimming (e.g., torque to deflash of less than 60 in-lbf). In contrast, as evidenced by the comparative data points concentrated on the right-hand side of FIGS. 18 and 19, bottles prepared with the conventional mold assembly C1 only exhibit suitable drop impact strength (i.e., high drop impact pass rate and/or high average drop height) at high torque levels, such as those above 60 in-lbf. At lower torque levels, comparative bottles exhibit less-than-acceptable drop impact strength. Thus, containers produced with inventive mold E1 maximize drop impact performance, while minimizing the effort required for deflashing.

As illustrated in Table 3 and FIG. 18, bottles produced with inventive mold assembly E1 tended to exhibit greater than 80 percent pass rate at 3 feet, while simultaneously having torque values in the 0 to 20 in-lb$_f$ range. On the contrary, bottles produced with inventive mold assembly C1 only exhibited greater than 80 percent pass rate at 3 feet, when the flash was hard to remove (torque values in the 60-100 in-lb$_f$ range). Since 80 to 100 percent pass rate at 3 feet appears to be the maximal attainable drop performance for this particular container produced as described in Example 1, above, it may be concluded that bottles produced with the E1 mold show a 66 to 100 percent reduction in torque required to deflash the container, relative to bottles produced with the C1 mold, e.g., analogous bottles that do not include a support bead, at mold setup conditions which give optimal drop performance.

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

We claim:

1. An extrusion blow molded container comprising:
   a neck;
   a body; and
   a base,
   wherein said base comprises at least one base parting line resulting from the formation of said container in a blow molding apparatus, wherein said base further comprises a parting line support bead for reinforcing at least a portion of said base parting line, wherein said support bead has a height-to-width ratio of at least 0.05:1 and not more than 2:1.

2. The container of claim 1, wherein said support bead is solid.

3. The container of claim 1, wherein the cross sectional area of said support bead is less than the height of the support bead multiplied by the width of the support bead.

4. The container of claim 1, wherein said support bead presents a curvilinear lateral cross section.

5. The container of claim 1, wherein the height of said support bead is at least 0.005 inches and not more than about 0.100 inches.

6. The container of claim 1, wherein said support bead extends along at least 90 percent of the length of said base of said container.

7. The container of claim 1, wherein the ratio of the height of said support bead to the average thickness of said base of said container adjacent said support bead is at least 0.5:1 and not more than 5:1.

8. The container of claim 1, wherein the container is formed from a material having a flexure modulus of at least 1550 MPa.

9. The container of claim 8, wherein said material comprises at least one polyester.

10. The container of claim 9, wherein said container has an internal volume of at least 80 fluid ounces (fl.oz.) and not more than 200 fl.oz.

11. The container of claim 10, wherein said container has a 3-foot drop impact pass rate of at least 70 percent.

12. The container of claim 1, wherein said container has a sidewall haze value of less than 15 percent.

13. An extrusion blow molded container comprising:
    a neck;
    a body;
    a base; and
    a supported tail flash extending along at least a portion of said base, wherein said supported tail flash includes a support bead coupled to said base and an elongated portion extending outwardly from at least part of said support bead,
    wherein said elongated portion of said tail flash is configured for removal from said support bead, wherein the torque required to remove said elongated portion from said support bead is at least 15 percent less than the torque required to remove the tail flash from an analogous extrusion blow molded container that does not include a support bead.

14. The container of claim 13, wherein said elongated portion comprises a pinch portion and a flash portion, wherein said pinch portion is coupled to said support portion of said tail flash, wherein said pinch portion has a thickness of at least 0.001 and not more than 0.075 inches.

15. The container of claim 13, wherein said container has a total internal volume of at least 80 fluid ounces (fl. oz.) and not more than 200 fl. oz., wherein said container exhibits a 3-foot drop impact pass rate of at least 70 percent subsequent to removal of said tail flash.

16. The container of claim 13, wherein the cross sectional area of said support portion is less than the height of said support portion multiplied by the width of said support portion.

17. The container of claim 13, wherein the ratio of the height of said support portion to the average thickness of said base of said container adjacent said support portion is at least 0.5:1 and not more than 5:1.

18. The container of claim 13, wherein said container is formed of a material having a flexure modulus of at least 1550 MPa.

19. The container of claim 18, wherein said material is a polyester material and said container has a sidewall haze value of less than 15 percent.

20. The container of claim 13, wherein the total internal volume of said container is at least about 6 fl. oz. and not more than 300 fl. oz.

\* \* \* \* \*